(12) United States Patent
Hayashida

(10) Patent No.: US 8,162,424 B2
(45) Date of Patent: Apr. 24, 2012

(54) INK-JET RECORDING METHOD AND INK-JET RECORDING APPARATUS

(75) Inventor: Kenta Hayashida, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 308 days.

(21) Appl. No.: 12/645,979

(22) Filed: Dec. 23, 2009

(65) Prior Publication Data

US 2010/0156969 A1    Jun. 24, 2010

(30) Foreign Application Priority Data

Dec. 24, 2008  (JP) ................. 2008-328717

(51) Int. Cl.
*B41J 29/38* (2006.01)
*G01D 11/00* (2006.01)

(52) U.S. Cl. .......................... 347/6; 347/100

(58) Field of Classification Search ............. 347/6, 19, 347/95, 100
See application file for complete search history.

(56) References Cited

U.S. PATENT DOCUMENTS

| | | | |
|---|---|---|---|
| 5,609,671 A | 3/1997 | Nagasawa | |
| 5,837,045 A | 11/1998 | Johnson et al. | |
| 6,084,610 A | 7/2000 | Ozaki et al. | |
| 7,018,452 B2 * | 3/2006 | Yamashita et al. | 106/31.27 |
| 2004/0244645 A1 * | 12/2004 | Doi et al. | 106/31.58 |

FOREIGN PATENT DOCUMENTS

| | | |
|---|---|---|
| JP | 08-003498 | 1/1996 |
| JP | 08-216389 | 8/1996 |
| JP | 08-216393 | 8/1996 |
| JP | 09-193529 | 7/1997 |
| JP | 2000-513396 | 10/2000 |
| JP | 2001294788 A | 10/2001 |
| JP | 2002-079695 | 3/2002 |
| JP | 2004197055 A | 7/2004 |
| JP | 2006028494 A | 2/2006 |
| JP | 2008-000959 | 1/2008 |

OTHER PUBLICATIONS

Notice of Reasons for Rejection for Japanese patent application No. 2008-328717 mailed Mar. 7, 2011.

* cited by examiner

*Primary Examiner* — An Do
(74) *Attorney, Agent, or Firm* — Banner & Witcoff, Ltd.

(57) ABSTRACT

An ink-jet recording method includes: determining an aggregation degree G (AB) brought about when the ink A and the ink B are brought in contact with each other, at least one of the ink A and the ink B containing a pigment; judging, based on the aggregation degree G (AB), whether or not a boundary portion PC is to be formed at a boundary between a recording portion PA of the ink A and a recording portion PB of the ink B by using an ink C; forming the recording portion PA; forming the recording portion PB; and forming the boundary portion PC if it is judged that the boundary portion PC is to be formed. In the ink jet recording method, the cost is low, the recording quality of a recorded matter is excellent, and the bleeding can be effectively avoided.

20 Claims, 18 Drawing Sheets

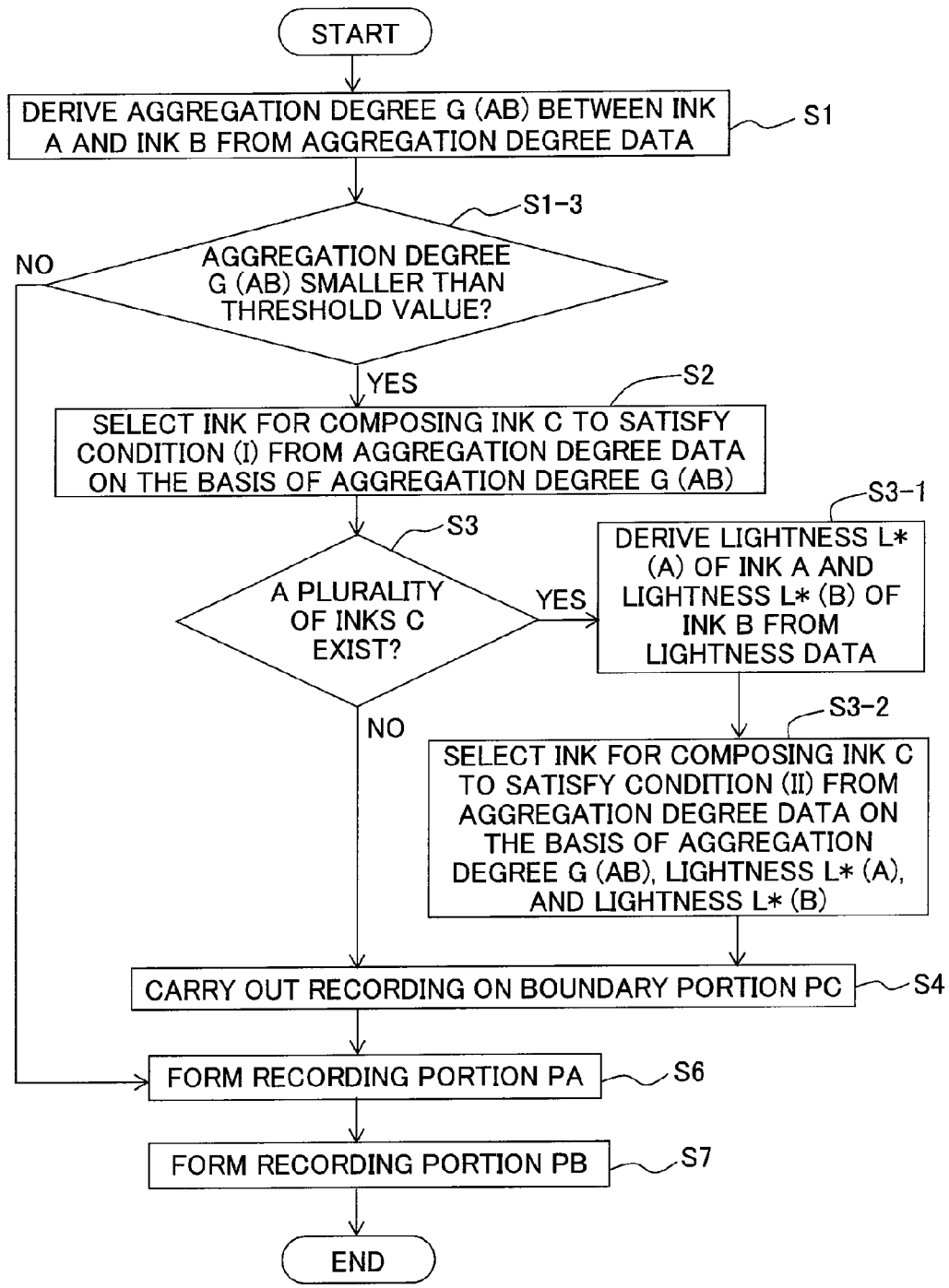

21  22
23

21  22
23

INK-JET RECORDING METHOD AND INK-JET RECORDING APPARATUS

CROSS REFERENCE TO RELATED APPLICATION

The present application claims priority from Japanese Patent Application No. 2008-328717, filed on Dec. 24, 2008, the disclosure of which is incorporated herein by reference in its entirety.

BACKGROUND OF THE INVENTION

1. Field of the Invention

The present invention relates to an ink-jet recording method and an ink jet recording apparatus.

2. Description of the Related Art

When the ink jet recording is performed, a phenomenon so-called bleeding, in which the ink is blurred, is caused in some cases at the boundary portion between areas having different color schemes. If the bleeding is caused as described above, the recording quality of the color image is deteriorated. Those having been hitherto suggested in order to suppress the bleeding include, for example, a technique in which an ink to be used for the boundary portion is selected based on the penetrating performance or permeability (Japanese Patent Application Laid-open No. 9-193529), a technique in which a reactive color ink is used for the boundary portion (Japanese Patent Application Laid-open No. 2002-79695), a technique in which a liquid for improving the printing performance is coated or applied to the boundary portion (Japanese Patent Application Laid-open No. 8-216389), and a technique in which a thinning out area for performing no recording is formed at the boundary portion (Japanese Patent Application Laid-open No. 2008-959).

However, the techniques described above involve the following problems. Firstly, the technique in which the ink to be used for the boundary portion is selected based on the permeability involves such a problem that the bleeding-preventive effect is insufficient. Secondly, in the technique in which the reactive color ink is used and in the technique which uses the liquid to improve the printing performance, it is necessary that the reactive color ink and the liquid for improving the printing performance should be prepared separately from the ink; and it is also necessary to provide, on the ink-jet recording apparatus, any mechanism for the reactive ink or the printing-performance improving liquid as described above, resulting in the increase in the cost. Further, in the technique in which the thinning out area is formed at the boundary portion, the color of the thinning out area is limited to the color of the recording paper (usually white), thus causing problem in view of the printing quality.

SUMMARY OF THE INVENTION

In view of the above, an object of the present invention is to provide an ink-jet recording method and an ink-jet recording apparatus in which the cost is low, in which the recording quality of a recorded matter is excellent, and which is capable of effectively preventing the bleeding.

According to a first aspect of the present invention, there is provided an ink-jet recording method including: determining an aggregation degree G (AB) brought about when the ink A and the ink B are brought in contact with each other, the inks A and B being different in color and composition from each other, each of which is composed by at least one ink selected from an ink set including at least two kinds of inks, which are subjected to recording on a medium while being brought in contact with each other, at least one of the ink A and the ink B containing a pigment; judging, based on the aggregation degree G (AB), whether or not a boundary portion PC is to be formed at a boundary between a recording portion PA of the ink A and a recording portion PB of the ink B by using an ink C which is composed by at least one ink selected from the ink set and which has a different composition from those of the ink A and the ink B; forming the recording portion PA with the ink A; forming the recording portion PB with the ink B; and forming the boundary portion PC with the ink C if it is judged that the boundary portion PC is to be formed.

According to a second aspect of the present invention, there is provided an ink-jet recording apparatus including: an ink accommodating section which accommodates at least two kinds of inks as an ink set; an ink jet head which performs recording by using at least one ink selected from the ink set; and a controller which controls the ink jet head, wherein the controller includes: an aggregation degree obtaining section which obtains an aggregation degree G (AB) brought about when the ink A and the ink B are brought in contact with each other, the inks A and B being different in color and composition from each other, each of which is composed by at least one ink selected from the ink set, which are subjected to the recording on a medium while being brought in contact with each other, at least one of the ink A and the ink B containing a pigment; a recording portion PA forming section which forms the recording portion PA with the ink A; a recording portion PB forming section which forms the recording portion PB with the ink B; and a boundary portion PC forming section which forms a boundary portion PC at a boundary between the recording portion PA and the recording portion PB with an ink C which is composed by at least one ink selected from the ink set and which has a composition different from those of the ink A and the ink B.

The controller may further have a comparing and judging section which judges, based on the aggregation degree G (AB), whether or not the boundary portion PC is to be formed with the ink C.

BRIEF DESCRIPTION OF THE DRAWINGS

FIG. 2A shows a flow chart in relation to a second embodiment of the present invention.

DESCRIPTION OF THE PREFERRED EMBODIMENTS

Figure 1A:
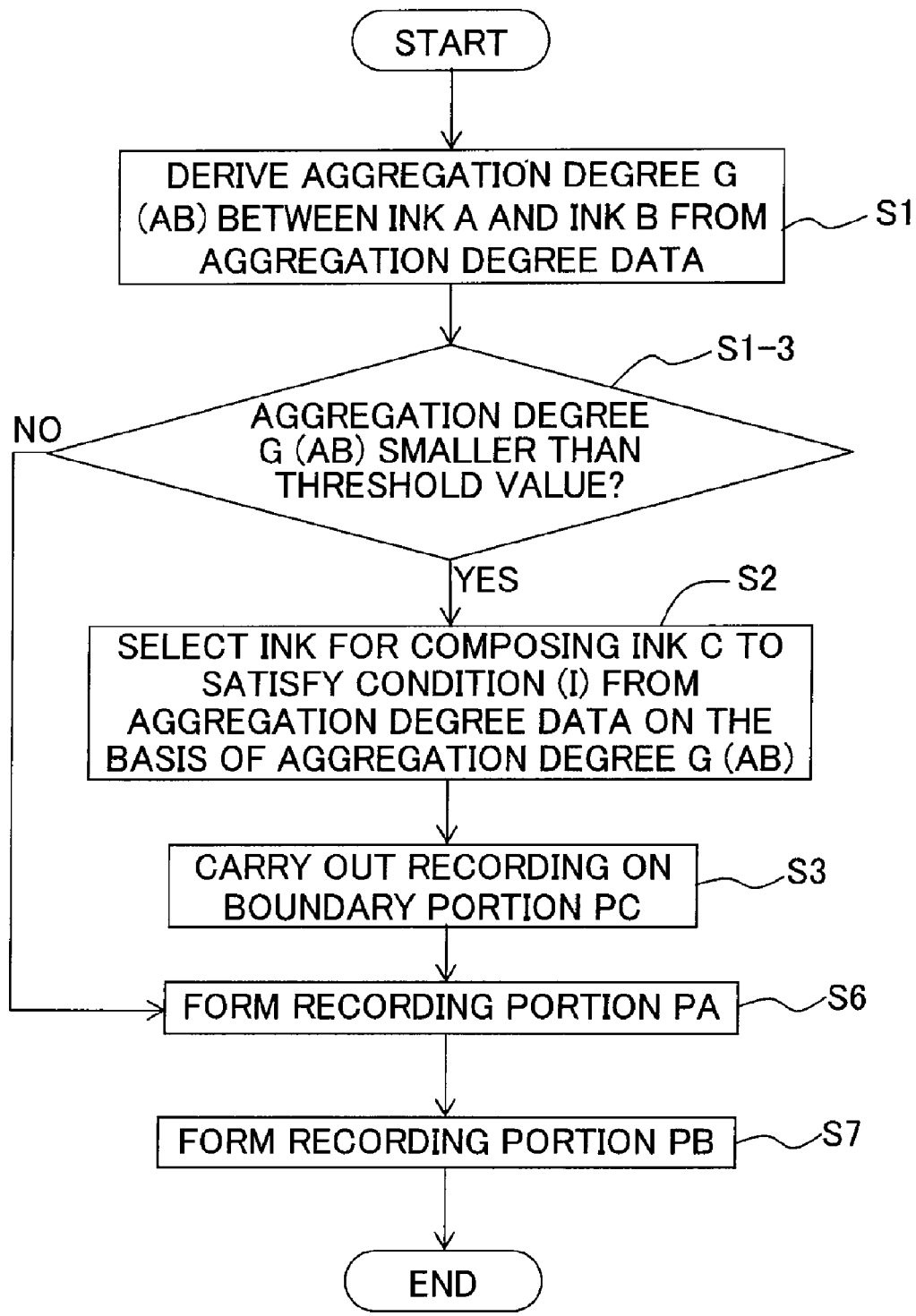
FIG. 1A shows a flow chart in relation to a first embodiment of the present invention.

In the ink jet recording method of the present invention, it is preferable that judgment is made that the boundary portion PC is to be formed if the aggregation degree G (AB) is lower than a predetermined value; and the forming of the boundary portion PC includes composing the ink C by selecting at least one ink from the ink set so that the following condition (I) is satisfied:

Condition (I): at least one of the following expression (1) and the following expression (2) is satisfied:

$$G(AC) > G(AB) \quad (1)$$

$$G(BC) > G(AB) \quad (2)$$

G (AC): aggregation degree provided in a case that the ink A and the ink C are brought in contact with each other;

G (BC): aggregation degree provided in a case that the ink B and the ink C are brought in contact with each other;

G (AB): aggregation degree provided in a case that the ink A and the ink B are brought in contact with each other.

In the ink jet recording apparatus of the present invention, it is preferable that the comparing and judging section judges that the boundary portion PC is to be formed if the aggregation degree G (AB) is lower than a predetermined value; and the boundary portion PC forming section includes an ink C composing section which composes the ink C by selecting at least one ink from the ink set so that the following condition (I) is satisfied:

Condition (I): at least one of the following expression (1) and the following expression (2) is satisfied:

$$G(AC) > G(AB) \quad (1)$$

$$G(BC) > G(AB) \quad (2)$$

G (AC): aggregation degree provided when the ink A and the ink C are brought in contact with each other;

G (BC): aggregation degree provided when the ink B and the ink C are brought in contact with each other;

G (AB): aggregation degree provided when the ink A and the ink B are brought in contact with each other.

The ink-jet recording method and the ink-jet recording apparatus of the present invention will be explained in detail as exemplified by exemplary embodiments. However, the present invention is neither restricted nor limited to the following description.

As described above, in the ink-jet recording method and the ink-jet recording apparatus of the present invention, the recording is performed on the recording medium by using at least one ink selected from the ink set.

The inks composing the ink set include, for example, a water base ink. The water base ink contains a coloring agent and water.

The coloring agent is not specifically limited. The coloring agent may be any one of a pigment and a dye. A mixture, which is obtained by mixing the pigment and the dye, may be used as the coloring agent. However, at least one of the inks composing the ink set contains the pigment, for the following reason. That is, as described later on, it is necessary in the present invention that the ink or inks is/are appropriately selected from the ink set to compose the ink A and the ink B, and at least one ink of the ink A and the ink B contains the pigment.

The pigment is not specifically limited. Those usable include, for example, carbon black, inorganic pigments, and organic pigments. The carbon black includes, for example, furnace black, lamp black, acetylene black, and channel black. The inorganic pigment includes, for example, titanium oxide, inorganic pigments based on iron oxide, and inorganic pigments based on carbon black. The organic pigment includes, for example, azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Any other pigment is also usable provided that the pigment is dispersible in the water phase. The pigments as described above include, for example, C. I. Pigment Blacks 1, 6, and 7; C. I. Pigment Yellows 1, 2, 3, 12, 13, 14, 15, 16, 17, 55, 73, 74, 75, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; and C. I. Pigment Greens 7 and 36.

The pigment may include self-dispersible pigments. The self-dispersible pigment is dispersible in water without using any dispersing agent, for example, owing to the fact that at least one of the hydrophilic functional group and the salt thereof including, for example, carboxyl group, carbonyl group, hydroxyl group, and sulfon group is introduced into the surfaces of the pigment particles by the chemical bond directly or with any polyvalent group intervening therebetween.

The self-dispersible pigment is not specifically limited. It is possible to use self-dispersible pigments subjected to the surface treatment by any one of methods described, for example, in Japanese Patent Application Laid-open No. 8-3498 and Japanese Patent Application Laid-open No. 2000-513396 (PCT). For example, any commercially available product may be used for the self-dispersible pigment. The commercially available product includes, for example, "CAB-O-JET (trade name) 200", "CAB-O-JET (trade name) 250", "CAB-O-JET (trade name) 260", "CAB-O-JET (trade name) 270", "CAB-O-JET (trade name) 300", and "CAB-O-JET (trade name) 700" produced by Cabot Specialty Chemicals; "BONJET (trade name) BLACK CW-1", "BONJET (trade name) BLACK CW-2", and "BONJET (trade name) BLACK CW-3" produced by Orient Chemical Industries, Ltd.; and "LIOJET (trade name) WD BLACK 002C" produced by Toyo Ink Mfg. Co., Ltd.

The pigment, which is usable as the raw material for the self-dispersible pigment, is not specifically limited. It is possible to use any one of inorganic pigments and organic pigments. The pigment, which is suitable to perform the surface treatment, includes, for example, carbon blacks such as "MA8" and "MA100" produced by Mitsubishi Chemical Corporation and "Color Black FW200" produced by Degussa.

The blending amount of the pigment (pigment ratio) with respect to the total amount of the ink is not specifically limited, which can be appropriately determined depending on, for example, the desired optical density and the coloration or colorfulness. The pigment ratio is, for example, 0.1% by weight to 20% by weight, preferably 1% by weight to 10% by weight, and more preferably 2% by weight to 8% by weight. One type of the pigment as described above may be used singly, or two or more types of the pigments as described above may be used in combination.

The dye is not specifically limited, which includes, for example, direct dyes, acid dyes, basic dyes, and reactive dyes. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. C. I. Direct Black includes, for example, C. I. Direct Blacks 17, 19, 32, 51, 71, 108, 146, 154, and 168. C. I. Direct Blue includes, for example, C. I. Direct Blues 6, 22, 25, 71, 86, 90, 106, 199, and 307. C. I. Direct Red includes, for example, C. I. Direct Reds 1, 4, 17, 28, 83, and 227. C. I. Direct Yellow includes, for example, C. I. Direct Yellows 12, 24, 26, 86, 98, 132, 142, and 173. C. I. Direct Orange includes, for example, C. I. Direct Oranges 34, 39, 44, 46, and 60. C. I. Direct Violet includes, for example, C. I. Direct Violets 47 and 48. C. I. Direct Brown includes, for example, C. I. Direct Brown 109. C. I. Direct Green includes, for example, C. I. Direct Green 59. C. I. Acid Black includes, for example, C. I. Acid Blacks 2, 7, 24, 26, 31, 52, 63, 112, and 118. C. I. Acid Blue includes, for example, C. I. Acid Blues 9, 22, 40, 59, 93, 102, 104, 117, 120, 167, 229, and 234. C. I. Acid Red includes, for example, C. I. Acid Reds 1, 6, 32, 37, 51, 52, 80, 85, 87, 92, 94, 115, 180, 256, 289, 315, and 317. C. I. Acid Yellow includes, for example, C. I. Acid Yellows 11, 17, 23, 25, 29, 42, 61, and 71. C. I. Acid Orange includes, for example, C. I. Acid Oranges 7 and 19. C. I. Acid Violet includes, for example, C. I. Acid Violet 49. C. I. Basic Black includes, for example, C. I. Basic Black 2. C. I. Basic Blue includes, for example, C. I. Basic Blues 1, 3, 5, 7, 9, 24, 25, 26, 28, and 29. C. I. Basic Red includes, for example, C. I. Basic Reds 1, 2, 9, 12, 13, 14, and 37. C. I. Basic Violet includes, for example, C. I. Basic Violets 7, 14, and 27. C. I. Food Black includes, for example, C. I. Food Blacks 1 and 2. The dyes as described above are excellent, for example, in the characteristics such as the vividness, the water solubility, and the stability.

The blending amount of the dye (dye ratio) with respect to the total amount of the water base ink is not specifically limited, which is, for example, 0.1% by weight to 20% by weight, preferably 1% by weight to 10% by weight, and more preferably 2% by weight to 8% by weight. One type of the dye as described above may be used singly, or two or more types of the dyes as described above may be used in combination.

Water is preferably ion-exchanged water or pure water. The blending ratio of water (water ratio) with respect to the total amount of the water base ink is appropriately determined depending on, for example, the desired ink characteristics. The water ratio may be, for example, the balance of the other components.

The water base ink may further contain a humectant which prevents the ink from being dried at the nozzle portion of the ink jet head, and a penetrant which adjusts the drying speed on the recording medium.

The humectant is not specifically limited, which includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent alcohols such as polyalkylene glycols, alkylene glycols, and glycerol; 2-pyrrolidone; N-methyl-2-pyrrolidone; and 1,3-dimethyl-2-imidazolidinone. The polyalkylene glycol is not specifically limited, which includes, for example, polyethylene glycol and polypropylene glycol. The alkylene glycol is not specifically limited, which includes, for example, ethylene glycol, propylene glycol, butylene glycol, diethylene glycol, triethylene glycol, dipropylene glycol, tripropylene glycol, thiodiglycol, and hexylene glycol. In particular, it is preferable to use polyvalent alcohols such as alkylene glycol and glycerol. One type of the humectant as described above may be used singly, or two or more types of the humectants as described above may be used in combination.

The blending amount (humectant ratio) of the humectant with respect to the total amount of the water base ink is not specifically limited. The blending amount (humectant ratio) is, for example, 0% by weight to 95% by weight, preferably 5% by weight to 80% by weight, and more preferably 5% by weight to 50% by weight.

The penetrant is not specifically limited, which includes, for example, glycol ether compounds. The glycol ether compound is not specifically limited, which includes, for example, ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. One type of the penetrant as described above may be used singly, or two or more types of the penetrants as described above may be used in combination.

The blending amount (penetrant ratio) of the penetrant with respect to the total amount of the water base ink is not specifically limited. The blending amount (penetrant ratio) is, for example, 0% by weight to 20% by weight. When the penetrant ratio is in the range described above, it is possible to obtain the more preferred permeability of the ink into the recording medium such as the recording paper. The penetrant ratio is preferably 0.1% by weight to 15% by weight and more preferably 0.5% by weight to 10% by weight.

The water base ink may further contain conventionally known additives, if necessary. The additive includes, for example, surfactants, viscosity-adjusting agents, surface tension-adjusting agents, and fungicides. The viscosity-adjusting agent includes, for example, polyvinyl alcohol, cellulose, and water-soluble resin.

The water base ink can be prepared, for example, such that the coloring agent, water, and optionally other additive components are mixed uniformly or homogeneously by any conventionally known method, and undissolved matters are removed by a filter or the like.

The ink set includes two or more types of the inks. The ink set may include, for example, the water base inks of four colors of yellow (Y), magenta (M), cyan (C), and black (Bk). A water-soluble black ink containing the black pigment is preferably usable as the black (Bk). The ink set may include a water base light ink in addition to the inks of four colors. The water base light ink is an ink in which the blending amount of the coloring agent is smaller than that of the ordinary water base ink having the same color as each of those included in the ink set described above (for example, the blending amount of the coloring agent is not more than the half of the blending amount of the ordinary water base ink). The water base light ink includes, for example, water base light yellow (LY), water base light magenta (LM), and water base light cyan (LC).

On the other hand, the ink jet recording apparatus of the present invention has the ink-accommodating section, the ink jet head, and the controller which controls the ink jet head. The ink jet head includes the recording portion PA forming mechanism, the recording portion PB forming mechanism, and the boundary portion PC forming mechanism. The ink-jet recording apparatus of the present invention may further comprise the memory and the recording-related information obtaining mechanism. In the ink jet recording apparatus of the present invention, those other than the controller, the memory, and the recording-related information obtaining mechanism can be constructed in the same manner as in any conventional ink-jet apparatus.

Figure 10:
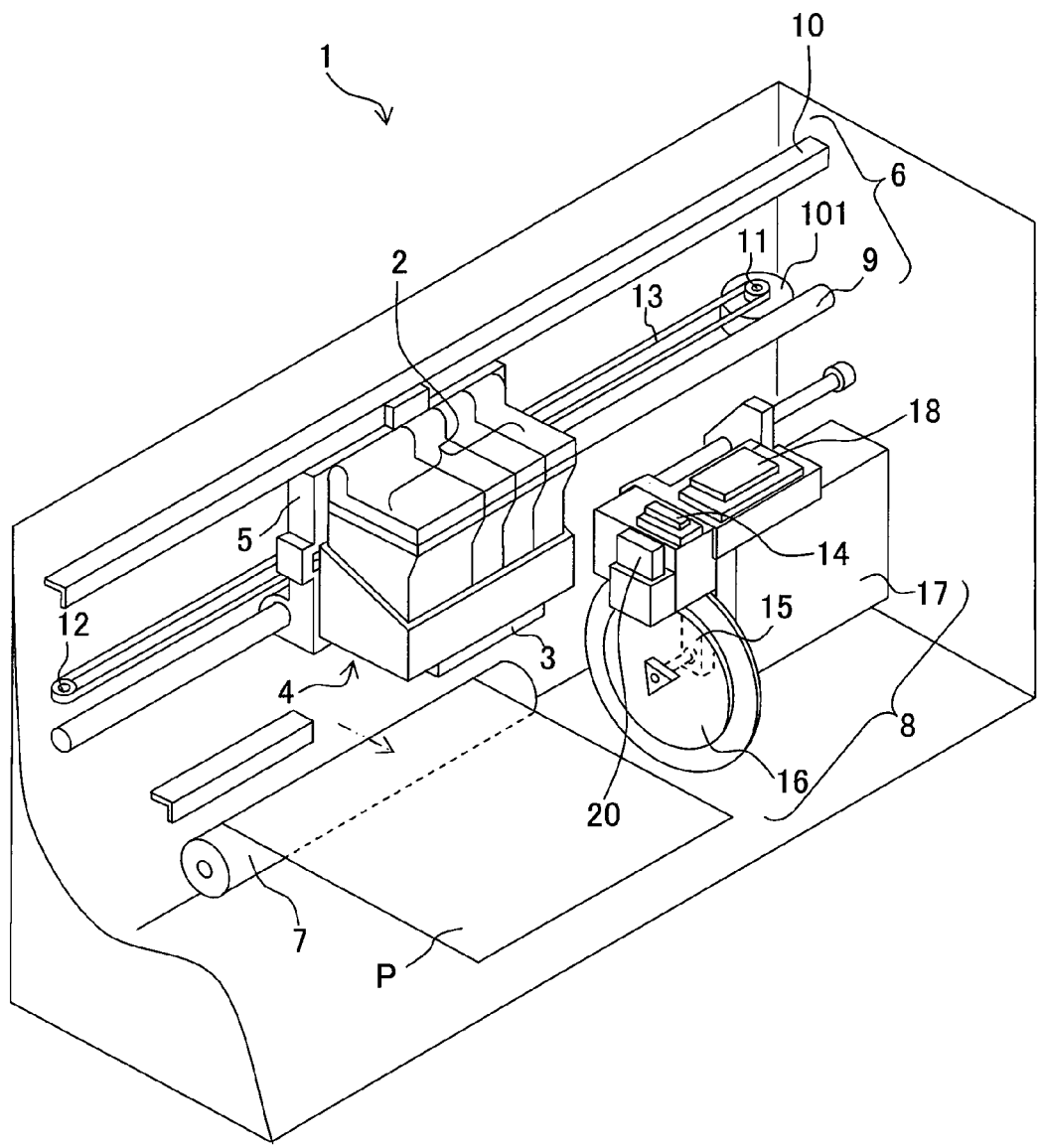
FIG. 10 shows an example of the construction of the ink-jet recording apparatus of the present invention.

As shown in FIG. 10, the ink-jet recording apparatus 1 comprises, as main constitutive members, four ink cartridges 2, an ink-jet head 3, a head unit 4, a carriage 5, a driving unit 6, a platen roller 7, and a purge unit 8. In the ink-jet recording apparatus 1, the ink cartridges 2 are the ink accommodating section. The image, which includes the recording portion PA, the recording portion PB, and the boundary portion PC, can be recorded by the ink jet head 3.

Each of the four ink cartridges 2 contains each one of the inks of four colors of black (Bk), yellow (Y), magenta (M), and cyan (C). The ink-jet head 3 performs the printing on a recording medium P such as the recording paper. The head unit 4 is provided with the ink-jet head 3. The four ink cartridges 2 and the head unit 4 are carried on the carriage 5. The driving unit 6 reciprocatively moves the carriage 5 in the linear direction. The platen roller 7 extends in the reciprocating direction of the carriage 5, and the platen roller 7 is arranged to be opposite or to face to the ink-jet head 3.

The driving unit 6 includes a carriage shaft 9, a guide plate 10, two pulleys 11, 12, and an endless belt 13. The carriage shaft 9 is arranged at a lower end portion of the carriage 5, and the carriage shaft 9 extends in parallel to the platen roller 7. The guide plate 10 is arranged at an upper end portion of the carriage 5, and the guide plate 10 extends in parallel to the carriage shaft 9. The two pulleys 11, 12 are arranged at both end portions of the carriage shaft 9 between the carriage shaft 9 and the guide plate 10. The endless belt 13 is allowed to travel between the two pulleys 11, 12.

In the ink-jet recording apparatus 1, when the pulley 11 is rotated positively or reversely by the driving of a carriage motor 101, the carriage 5, which is joined to the endless belt 13, is reciprocatively moved in the linear direction along the carriage shaft 9 and the guide plate 10 in accordance with the positive or reverse rotation of the pulley 11.

The recording medium P is fed from a paper feed cassette (not shown) provided at a side portion or a lower portion of the ink jet recording apparatus 1. The recording mechanism P is introduced into the space between the ink-jet head 3 and the platen roller 7. Accordingly, the predetermined printing is performed with the inks discharged or jetted from the ink-jet head 3 on the recording medium P. The recording medium P is thereafter discharged from the ink jet recording apparatus 1. In FIG. 10, a paper feed mechanism and a paper discharge mechanism for the recording medium P are omitted from the illustration.

The purge unit 8 is provided on the side of the platen roller 7. The purge unit 8 is arranged so that the purge unit 8 is opposed to the ink jet head 3 when the head unit 4 is at the reset position (disposed over or above the purge unit 8 in this embodiment). The purge unit 8 includes a purge cap 14, a pump 15, a cam 16, and an ink storage section 17. The purge cap 14 covers a plurality of nozzles (not shown) of the ink jet head 3 when the head unit 4 is at the reset position. The pump 15 sucks any defective ink containing bubbles or the like stored in the ink-jet head 3, in accordance with the driving of the cam 16. Accordingly, the ink jet head 3 is restored. The sucked defective ink is stored in the ink storage section 17.

A wiper member 20 is arranged adjacently to the purge unit 8 at a position of the purge unit 8 disposed on the side of the platen roller 7. The wiper member 20 is formed to have a spatula-shaped form. The wiper member 20 wipes out the nozzle-formed surface of the ink-jet head 3 in accordance with the movement of the carriage 5. With reference to FIG. 10, the cap 18 covers the plurality of nozzles of the ink-jet head 3 to be returned to the reset position when the recording is completed, in order to prevent the ink from being dried.

In the case of the ink-jet recording apparatus 1 of this embodiment, the four ink cartridges 2 are carried on one carriage 5. However, the present invention is not limited thereto. In the ink-jet recording apparatus of the present invention, the four ink cartridges may be carried on a plurality of carriages. The ink cartridges may be arranged and fixed in the ink jet recording apparatus without being carried on the carriage. In this embodiment, for example, the ink cartridges are connected to the head unit carried on the carriage, for example, by tubes, and the inks are supplied from the ink cartridges to the head unit.

The ink jet recording apparatus of the present invention may be the serial type ink-jet recording apparatus shown in FIG. 10, or the ink jet recording apparatus of the present invention may be a line type ink-jet recording apparatus.

Next, in the ink-jet recording method and the ink-jet recording apparatus of the present invention, the inks are appropriately selected from the ink set to compose the ink A and the ink B. The recording portion PA is formed with the ink A, and the recording portion PB is formed with the ink B. Specifically, for example, the color scheme or the color arrangement is determined for the recording portion PA and the recording portion PB based on the predetermined image information. The inks, which are selected from the ink set depending on the color scheme, are discharged at predetermined ratios onto the recording medium to form the recording portion PA and the recording portion PB. For example, when the recording portion PA has the black color, then the black ink is selected from the ink set, and the black ink is discharged onto the recording medium to form the black recording portion PA on the recording medium. For example, when the recording portion PB has any color (for example, red) obtained by mixing a plurality of colors, then a plurality of color inks are discharged from the ink set onto the recording medium while determining discharge ratios in order to compose the ink B based on the predetermined image information, and the ink B, which is provided to form the recording portion PB, is prepared on the recording medium. Therefore, in the present invention, when the inks, which correspond to the color scheme of the recording portion PA and recording portion PB, exist in the ink set, the inks, which are selected from the ink set, are the ink A and the ink B. On the other hand, in the present invention, when the inks, which correspond to the color scheme of the recording portion PA and the recording portion PB, do not exist in the ink set, then the inks are selected from the ink set in accordance with the color scheme, and the inks are discharged onto the recording medium. Therefore, in this case, the ink A and the ink B are prepared on the recording medium. The fact as described above holds identically for the ink C for forming the boundary portion PC.

Next, in the ink-jet recording method and the ink-jet recording apparatus of the present invention, the boundary portion PC is formed by using the ink C at the boundary between the recording portion PA and the recording portion PB. As described above, in the ink-jet recording method and the ink-jet recording apparatus of the present invention, the ink is selected from the ink set to compose the ink C so that Condition (I), which is based on the index of the aggregation degree, is satisfied. In the present invention, the bleeding can be avoided at the boundary portion between the recording portion PA and the recording portion PB by allowing the ink C and the ink A to cohere or allowing the ink C and the ink B to cohere. Further, in the present invention, the hue of the boundary portion PC is adjustable. Therefore, it is possible to enhance the recording quality of the recorded matter. Further, in the present invention, any special treatment liquid is not used distinctly from the ink, and any special mechanism is not required as well. Therefore, it is possible to lower the cost.

The aggregation between the ink A and the ink C and the aggregation between the ink B and the ink C are caused by the aggregation of the pigment contained in the ink. Therefore, at least one ink of the ink A and the ink B contains the pigment. In particular, it is preferable that at least one ink of the ink A and the ink B is a water base black ink containing a black pigment.

In the present invention, the order or sequence for forming the recording portion PA, the recording portion PB, and the boundary portion PC is not specifically limited. However, it is preferable that the boundary portion PC is formed prior to at least one of the recording portion PA and the recording portion PB.

Figure 7A:
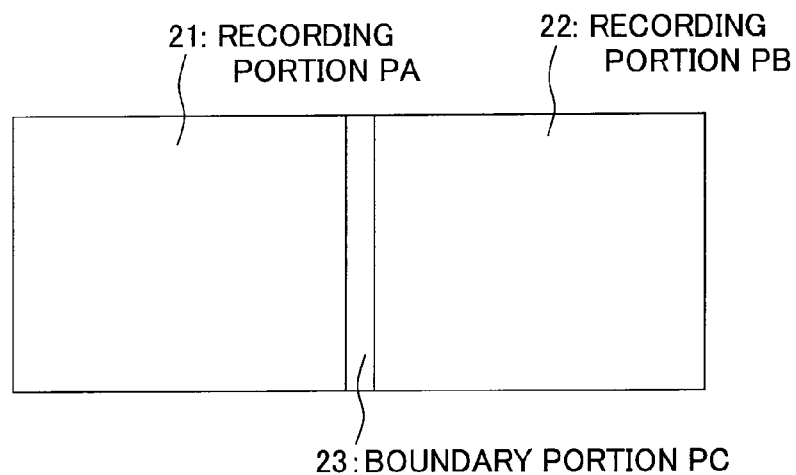
FIGS. 7A and 7B illustrate boundary portions PC.
Figure 7B:
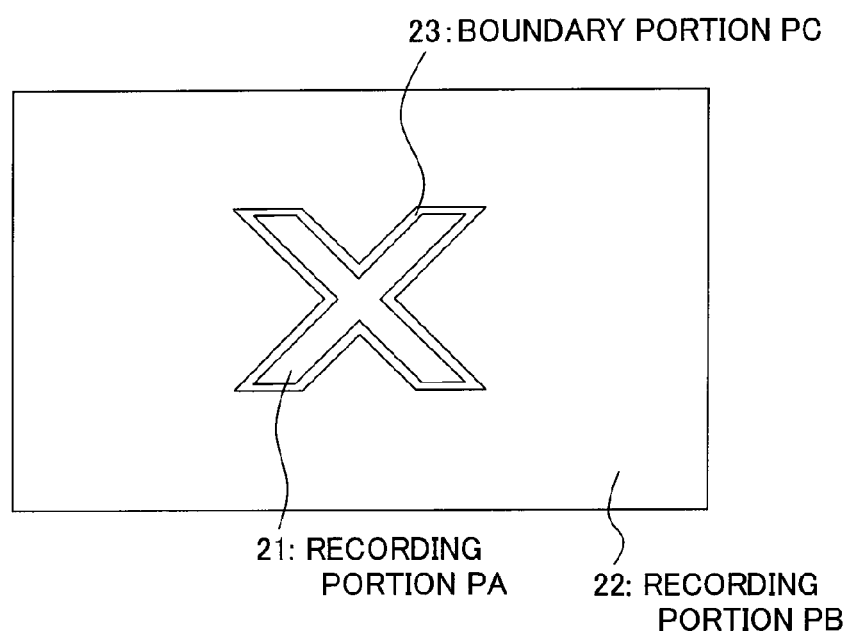

As shown in FIG. 7A, when the recording is performed so that the recording portion PA (21) and the recording portion PB (22) are adjacent to one another, the following procedure is available. That is, the recording portion PA (21) is recorded, and then the boundary portion PC (23) is recorded on the portion which is the boundary between the recording portion PA (21) and the recording portion PB (22). Subsequently, the recording portion PB (22) is recorded on the side opposite to the recording portion PA (21) with respect to the boundary portion PC (23). Distinctly from the above, for example, as shown in FIG. 7B, the following procedure is also available. That is, the recording portion PA (21) is recorded as a letter and/or a graphic, and then the boundary portion PC (23) is recorded around the recording portion PA (21). Subsequently, the recording portion PB (22) is recorded as a background.

If the expression (1) of Condition (I) is satisfied or fulfilled, the position of the boundary portion PC is located in the area of the end portion of the recording portion PB which would be brought in contact with the recording portion PA unless the boundary portion PC is formed. In other words, the boundary portion PC is formed while the end portion area of the recording portion PB is substituted with the boundary portion PC. In this way, the position, at which the ink C is allowed to cohere with the ink A, can be the original position of the contact between the recording portion PA and the recording portion PB. If the expression (2) of Condition (I) is satisfied or fulfilled, the position of the boundary portion PC is located in the area of the end portion of the recording portion PA which would be brought in contact with the recording portion PB unless the boundary portion PC is formed. In other words, the boundary portion PC is formed while the end portion area of the recording portion PA is substituted with the boundary portion PC. In this way, the position, at which the ink C is allowed to cohere with the ink B, can be the original position of the contact between the recording portion PA and the recording portion PB.

It is preferable that the boundary portion PC is inconspicuous in order to improve the recording quality. In order to make the boundary portion PC to be inconspicuous, for example, the following methods (a) to (c) are available. The following method (a) falls under Condition (II) described below, and the following method (b) falls under Condition (III) described below.

(a) The position of the boundary portion PC, at which the aggregation of the boundary portion PC is caused, is selected.

(b) The color difference with respect to the boundary portion PC is adjusted.

(c) The width of the boundary portion PC is narrowed.

Condition (II): if the following expression (3) is satisfied, the expression (1) is satisfied, or if the following expression (4) is satisfied, the expression (2) is satisfied:

$$L^*(A) < L^*(B) \tag{3}$$

$$L^*(A) > L^*(B) \tag{4}$$

L* (A): lightness L* of the ink A;
L* (B): lightness L* of the ink B.

Condition (III): at least one color difference ΔE of color difference ΔE (AC) between the ink A and the ink C and color difference ΔE (BC) between the ink B and the ink C is smallest.

The method (a), in which the position of the occurrence of the aggregation of the boundary portion PC is selected, is as follows. That is, when the lightness differs between the recording portion PA and the recording portion PB, the boundary portion PC is formed so that the position, at which the aggregation of the boundary portion PC is caused, is positioned on the side of the recording portion on which the lightness is low. For example, when the lightness L* (A) of the recording portion PA is lower than the lightness L* (B) of the recording portion PB (lightness L* (A)<lightness L* (B)), the aggregation is caused on the side of the recording portion PA with respect to the boundary portion PC (expression (1): aggregation degree G (AC)>aggregation degree G (AB)). On the contrary, for example, when the lightness L* (B) of the recording portion PB is lower than the lightness L* (A) of the recording portion PA (lightness L* (B)<lightness L* (A)), the aggregation is caused on the side of the recording portion PB with respect to the boundary portion PC (expression (2): aggregation degree G (BC)>aggregation degree G (AB)).

The method (b), in which the color difference with respect to the boundary portion PC is adjusted, is as follows. That is, the color difference ΔE is minimized between the boundary portion PC and at least one of the recording portion PA and the recording portion PB. The smaller the color difference ΔE is, the more similar the hue is between the boundary portion PC and at least one of the recording portion PA and the recording portion PB.

In the method (c) in which the width of the boundary portion PC is narrowed, it is preferable that the width is thinner. The width is, for example, 10 µm to 100 µm, preferably 10 µm to 60 µm, and more preferably 10 µm to 30 µm.

Figure 8A:
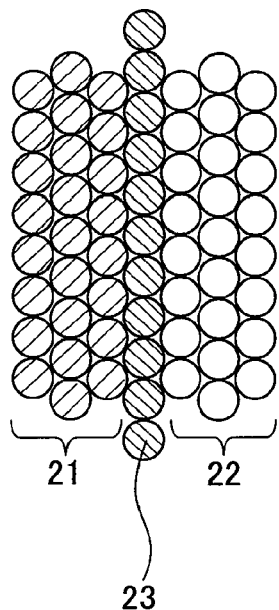
FIGS. 8A and 8B illustrate recording dots at the boundary portion PC.
Figure 8B:
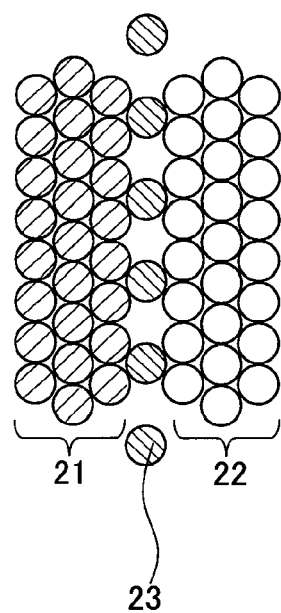

The boundary portion PC may be formed as a continuous area, or the boundary portion PC may be formed as a discontinuous area. As shown in FIG. 8A, for example, the boundary portion PC (23) may be formed as continuous dots between the recording portion PA (21) and the recording portion PB (22). Alternatively, as shown in FIG. 8B, for example, the boundary portion PC (23) may be formed as discontinuous dots between the recording portion PA (21) and the recording portion PB (22).

Figure 9A:
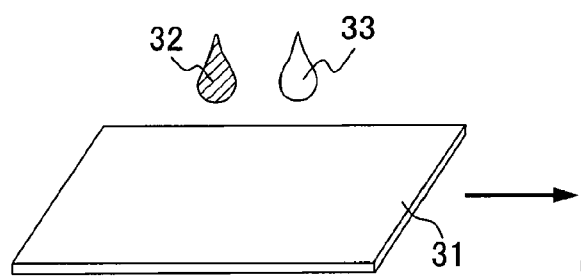
FIGS. 9A and 9B illustrate an example of a measuring method for measuring the aggregation degree between two kinds or types of inks.
Figure 9B:
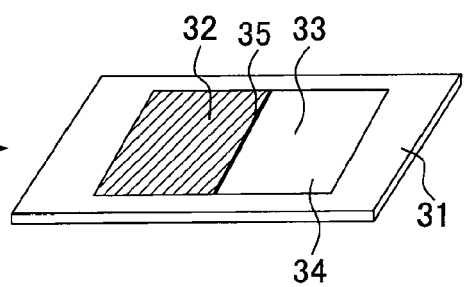

In the present invention, the term "aggregation degree" refers to the degree or extent of formation of aggregated matters in the ink or inks resulting from components contained in the both inks when the two types of inks are brought in contact with each other. For example, when the pigment water base ink and the dye water base ink are brought in contact with each other, the pigment, which has been dispersed in the ink, is aggregated in some cases by the action of the component contained in the dye water base ink. In the present invention, the "aggregation degree" can be appropriately determined by using the index or indexes of, for example, the size of aggregated matter, the amount of aggregated matter, and/or the velocity of aggregation. In the present invention, the "aggregation degree" can be evaluated, for example, by the technique as shown in FIG. 9. As shown in FIG. 9A, two types of inks 32, 33 are dripped onto a slide glass 31. Subsequently, as shown in FIG. 9B, the two types of inks 32, 33 are covered with a cover glass 34. Accordingly, as shown in FIG. 9B, the two types of inks 32, 33 are brought in contact with each other at an interface 35. Any occurrence of aggregated matter in the vicinity of the interface 35 is observed by using, for example, an optical microscope, and thus the aggregation degree is determined. In the present invention, the "aggregation degree" may be set at two levels, i.e., "aggregation is present" and "aggregation is absent". However, it is preferable that the "aggregation degree" is set at not less than three levels depending on the degree or extent of aggregation.

It is allowable that the ink-jet recording method of the present invention, which avoids the bleeding, is necessarily carried out when the ink-jet recording is performed. However, it is also allowable that the ink-jet recording method of the present invention is appropriately carried out depending on the necessity for the prevention of the bleeding. For example, in the ink-jet recording apparatus of the present invention, it is also allowable to automatically select whether or not the ink-jet recording method of the present invention is carried out depending on the recording-related information (type of the recording medium, type of the ink, recording resolution) and the printing contents (background is not white background, photograph printing). Alternatively, a user may select whether or not the ink-jet recording method of the present invention is carried out by pushing a button provided for the ink-jet recording apparatus or on the printer driver depending on the favorite of the user.

Next, an explanation will be made about the ink-jet recording method and the ink-jet recording apparatus of the present invention as exemplified by exemplary embodiments.

First Embodiment

Figure 1B:
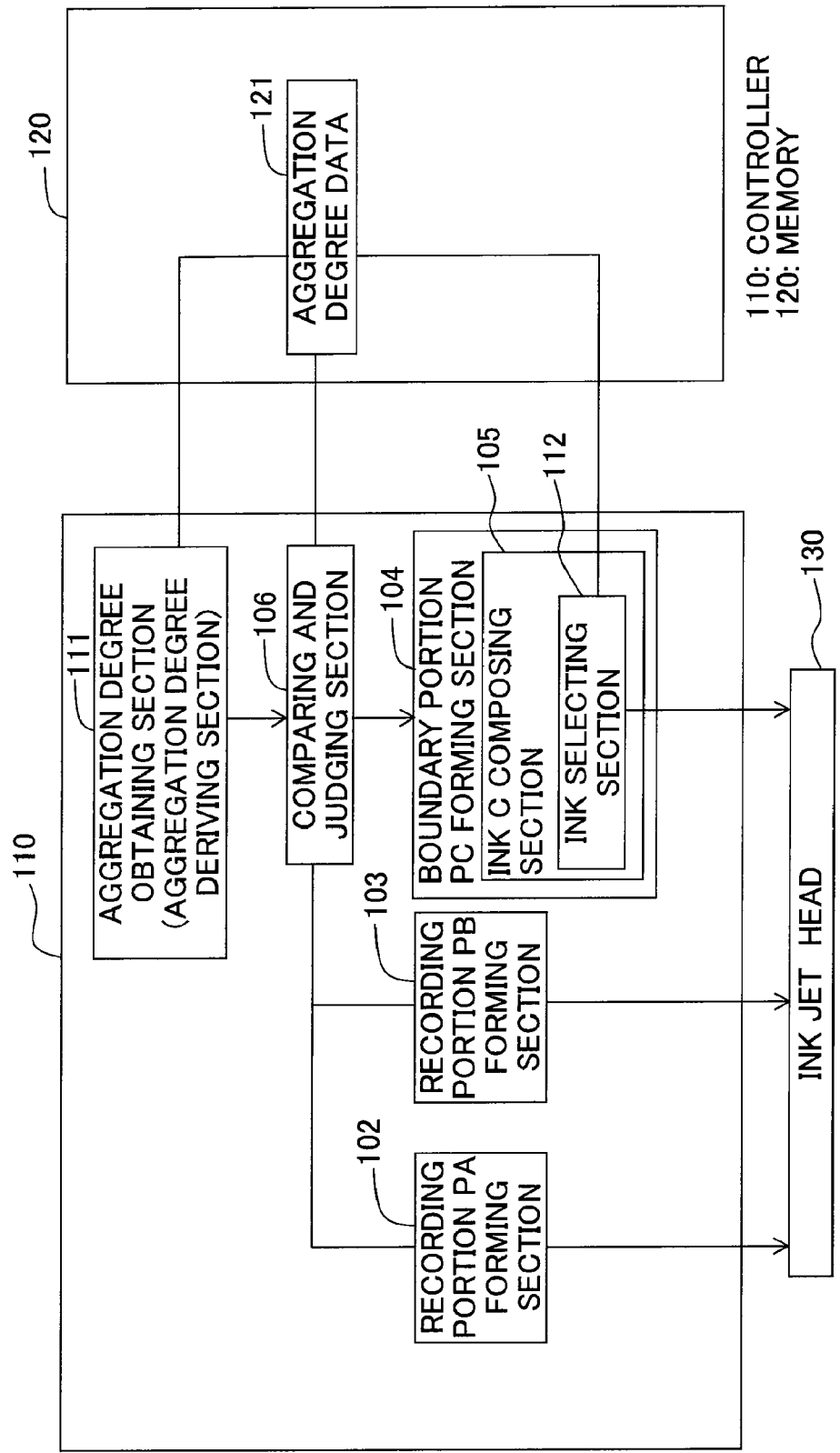
FIG. 1B shows a block diagram illustrating a relationship among a controller, a memory, and an ink jet head of an ink-jet recording apparatus in the first embodiment of the present invention.

The block diagram shown in FIG. 1B illustrates the relationship among the controller, the memory, and the ink jet head in an ink-jet recording apparatus of this embodiment. As shown in FIG. 1B, the aggregation degree data 121 is stored in the memory 120. The controller 110 includes the aggregation degree obtaining section (aggregation degree deriving section) 111, the comparing and judging section 106, the recording portion PA forming section 102, the recording portion PB forming section 103, and the boundary portion PC forming section 104. Further, the boundary portion PC forming section 104 includes the ink C composing section 105, and the ink C composing section 105 includes the ink selecting section 112. The aggregation degree deriving section 111 and the ink selecting section 112 are connected to the aggregation degree data 121. The ink jet recording apparatus of this embodiment may further include the recording-related information obtaining mechanism (not shown). For example, a central processing unit (CPU) is exemplified as the controller 110. For example, a random access memory (RAM), a read-only memory (ROM), a hard disk (HD), an optical disk, and a floppy (trade name) disk (FD) are exemplified as the memory 120. The memory 120 may be of the built-in type contained or equipped in an apparatus or of the external type such as an external storage device. The recording-related information obtaining mechanism includes, for example, a driver software and a menu selection button used to select the recording medium and/or the type of the ink to be used for the recording. The controller, the memory, and the recording-related information obtaining mechanism are also equivalently adoptable in the embodiments described later on.

In the present invention, for example, a aggregation degree table, in which the aggregation degree between two inks is indicated, is exemplified as the aggregation degree data.

Table 1 shows an example of the aggregation degree table. The aggregation degree table shown in Table 1 indicates the aggregation degrees among seven types of inks in total including respective single color inks of four types of black (Bk), yellow (Y), magenta (M), and cyan (C), and mixed inks of three types. Each of the mixed inks of the three types is prepared by mixing the inks of two colors at a ratio of 5:5, the inks of two colors being selected from the respective single color inks of yellow (Y), magenta (M), and cyan (C) (Y:M=5:5, Y:C=5:5, M:C=5:5). The mixed inks represent the red (R), the green (G), and the blue (B) respectively. In the aggregation degree table shown in Table 1, the aggregation degrees are classified in a stepwise manner from zero at which no aggregation occurs to the maximum value of 10. The larger the numerical value is, the higher the aggregation degree is.

TABLE 1

| | | Second ink | | | | | | |
|---|---|---|---|---|---|---|---|---|
| | | Bk | Y | M | C | Y:M = 5:5 | Y:C = 5:5 | M:C = 5:5 |
| First ink | Bk | | 10 | 8 | 2 | 9 | 6 | 5 |
| | Y | 10 | | 6 | 4 | 3 | 2 | 5 |
| | M | 8 | 6 | | 1 | 3 | 3.5 | 1 |
| | C | 2 | 4 | 1 | | 2.5 | 2 | 1 |
| | Y:M = 5:5 | 9 | 3 | 3 | 2.5 | | 1 | 2 |
| | Y:C = 5:5 | 6 | 2 | 3.5 | 2 | 1 | | 3 |
| | M:C = 5:5 | 5 | 5 | 1 | 1 | 2 | 3 | |

It is assumed that one of the two inks intended to evaluate the aggregation degree is designated as "first ink" (or "second ink") and the other is designated as "second ink" (or "first ink"). The aggregation degree is determined in accordance with the aggregation degree table shown in Table 1. For example, the aggregation degree, which is provided when the ink A is the black (Bk) and the ink B is the magenta (M), is "8" according to the aggregation degree table described above.

The combinations of the inks, in which the aggregation degree exceeds "8", reside in "10" of the black (Bk) and the yellow (Y) and "9" of the black (Bk) and the mixed ink (Y:M=5:5). Therefore, the yellow (Y) or the mixed ink (Y:M=5:5) can be selected as the ink C which satisfies Condition (I) described above, from the aggregation degree table.

Any aggregation degree, which is not shown, can be also calculated from the aggregation degrees shown in aggregation degree table of Table 1. For example, when the ink A, the ink B, and the ink C are composed by the secondary colors, the aggregation degrees of the secondary colors can be determined from the aggregation degrees and the ratios of the respective primary colors for composing the secondary colors. For example, the aggregation degree G (Bk (Y:M=7:3)), which is provided between the black (Bk) and the mixed ink (Y:M=7:3), can be determined in accordance with the following expression from the aggregation degree G (BkY) "10" between the black (Bk) and the yellow (Y), the aggregation degree G (BkM) between the black (Bk) and the magenta (M), and the mixing ratio 7:3 between the yellow (Y) and the magenta (M).

$$\text{Aggregation degree } G(Bk(Y{:}M{=}7{:}3)) = 10 \times 0.7 + 8 \times 0.3 = 9.4$$

Only the case, in which the constitutive ratio of the primary colors is 5:5, is described in relation to the aggregation degree of the mixed ink in the aggregation degree table shown in Table 1. However, the present invention is not limited thereto. It is also allowable to use to those in which the aggregation degrees are described for multiple levels in which the constitutive ratios of the primary colors of the mixed inks are, for example, 9:1 and 7:3.

The ink-jet recording method of this embodiment is carried out, for example, as follows by using the aggregation degree data shown in Table 1.

An explanation will be made about a case wherein the recording is performed while the two colors of the ink A and the ink B, which are composed differently from each other, are brought in contact with each other on the recording medium to form the recording portion PA and the recording portion PB. At first, as shown in FIGS. 1A and 1B, the aggregation degree G (AB) between the ink A and the ink B is derived with reference to the aggregation degree data 121 by the aggregation degree deriving section 111 (Step S1). For example, when the ink A is the black (Bk), and the ink B is the magenta (M), then the aggregation degree G (AB) is "8" according to the aggregation degree data 121.

Subsequently, in the comparing and judging section 106, the aggregation degree G (AB) is compared with a predetermined value, i.e., threshold value 1 to judge whether the aggregation degree G (AB) is larger or smaller than the predetermined value, i.e., threshold value 1 (Step S1-3). If the aggregation degree G (AB) is smaller than the threshold value 1, the ink for composing the ink C is selected (Step S2). If the aggregation degree G (AB) is not less than the threshold value 1, then the ink C is not selected, and the recording portion PA and the recording portion PB are formed (Steps S6 and S7).

As for the threshold value 1, a previously fixed value may be possessed by the controller. Alternatively, the user may be inputted from the outside every time, if necessary. For example, when it is intended to actively suppress the bleed of the ink, for example, when the recording medium, on which the ink blur tends to arise with ease, is used, or when a high-definition image is recorded, then the threshold value 1 can be set to be high. On the other hand, when it is unnecessary to actively suppress the bleed of the ink, for example, when the recording medium, on which the ink blur hardly arises, is used, or when simple image data is recorded, then the threshold value 1 can be set to be low. Alternatively, for example, the following procedure is also available. That is, the information of the printing mode or the like is fed to (inputted into) the controller from the recording-related information obtaining mechanism described above, and the controller itself sets or selects the optimum threshold value 1, if necessary.

Alternatively, an ink D, which is composed differently from the ink A and the ink B, may be assumed, and the threshold value 1 may be set to the maximum value capable of being provided for the aggregation degree G (AD) or the aggregation degree G (BD), provided that the aggregation degree G (AD) represents the aggregation degree brought about when the ink A and the ink D are brought in contact with each other, and the aggregation degree G (BD) represents the aggregation degree brought about when the ink B and the ink D are brought in contact with each other. Further alternatively, when if any threshold value 1 is not inputted at all, the setting may be made such that the threshold value 1 automatically has the maximum value capable of being provided for the aggregation degree G (AD) or the aggregation degree G (BD). In this embodiment, the threshold value 1 is the maximum value capable of being provided for the aggregation degree G (AD) or the aggregation degree G (BD). For example, when the ink A is the black (Bk), and the ink B is the magenta (M), then the ink D, which is composed differently from the ink A and the ink C is assumed. On this assumption, the maximum value, which is capable of being provided for the aggregation degree G (AD) or the aggregation degree G (BD), is the aggregation degree G (AD)=10 between the black (Bk) and the yellow (Y) when the ink D is the yellow (Y). In other words, the threshold value 1 is "10". When the ink A is the black (Bk), and the ink B is the magenta (M), then the aggregation degree G (AB) is "8" which is smaller than "10" according to the aggregation degree data 121. Therefore, the routine proceeds to the selection of the ink for composing the ink C (Step S2).

Subsequently, as shown in FIGS. 1A and 1B, the ink, which constitutes the ink C, is selected so that Condition (I) described above is satisfied, from the aggregation degree data 121 based on the derived aggregation degree G (AB) by the ink selecting section 112 included in the boundary portion PC forming section 104 (Step S2). For example, when the aggregation degree G (AB) is "8", the combinations of the inks, in which the aggregation degree exceeds "8", reside in "10" of the black (Bk) and the yellow (Y) and "9" of the black (Bk) and the mixed ink (Y:M=5:5). Therefore, the yellow (Y) or the mixed ink (Y:M=5:5) can be selected as the ink C which satisfies Condition (I) described above from the aggregation degree data 121. When a plurality of inks C are selected, then the ink C can be limited to one ink by using Condition (II) or Condition (III) as described later on, or the ink C may be limited to one ink in accordance with any other condition. Any other condition is also available. That is, for example, when the single color ink and the mixed ink are selected, the ink is limited to the single color ink in which the discharge mechanism is simple.

Subsequently, as shown in FIGS. 1A and 1B, the selected ink is discharged to carry out the recording of the boundary portion PC by the ink jet head 130 based on the instruction from the boundary portion PC forming section 104 including the ink selecting section 112 (Step S3). When the yellow (Y) is selected when the four types of single color inks of yellow (Y), magenta (M), cyan (C), and black (Bk) are accommodated in the ink-accommodating section of the ink jet recording apparatus, for example, the yellow (Y) may be discharged to the forming portion of the boundary portion PC. When the mixed ink (Y:M=5:5) is selected in the ink jet recording apparatus, then the yellow (Y) and the magenta (M) may be discharged respectively at a ratio of 5:5, and the mixed ink (Y:M=5:5) may be prepared on the forming portion of the boundary portion PC. In this embodiment, the yellow (Y), which is the single color ink with the simple discharge mechanism, is selected as the ink C, and the ink is discharged to the boundary portion PC forming portion.

Subsequently, the recording portion PA is formed by using the ink A based on the instruction from the recording portion PA forming section 102 (Step S6), and the recording portion PB is formed by using the ink B based on the instruction from the recording portion PB forming section 103 (Step S7).

In this embodiment, the extent of difference is not defined when it is judged whether the aggregation degree G (AB) is larger or smaller than the aggregation degree G (AC) and the aggregation degree G (BC). However, the present invention is not limited thereto. The extent of difference may be defined as in the following expressions (1') and (2'). In the following expressions (1') and (2'), k defines the extent of difference.

$$G(AC) > G(AB) + k \tag{1'}$$

$$G(BC) > G(AB) + k \tag{2'}$$

It is considered that the higher bleeding-preventive effect is obtained by using the ink having the higher aggregation degree. Therefore, when the extent of difference k is taken into consideration, it is possible to select the ink C having the higher bleeding-preventive effect. In the embodiment described above, the two types of the yellow (Y) and the mixed ink (Y:M=5:5) are selected. However, assuming that the extent of difference k is "1", the yellow (Y), which satisfies the expression (1') described above, is selected from the two types of inks.

Second Embodiment

Figure 2B:
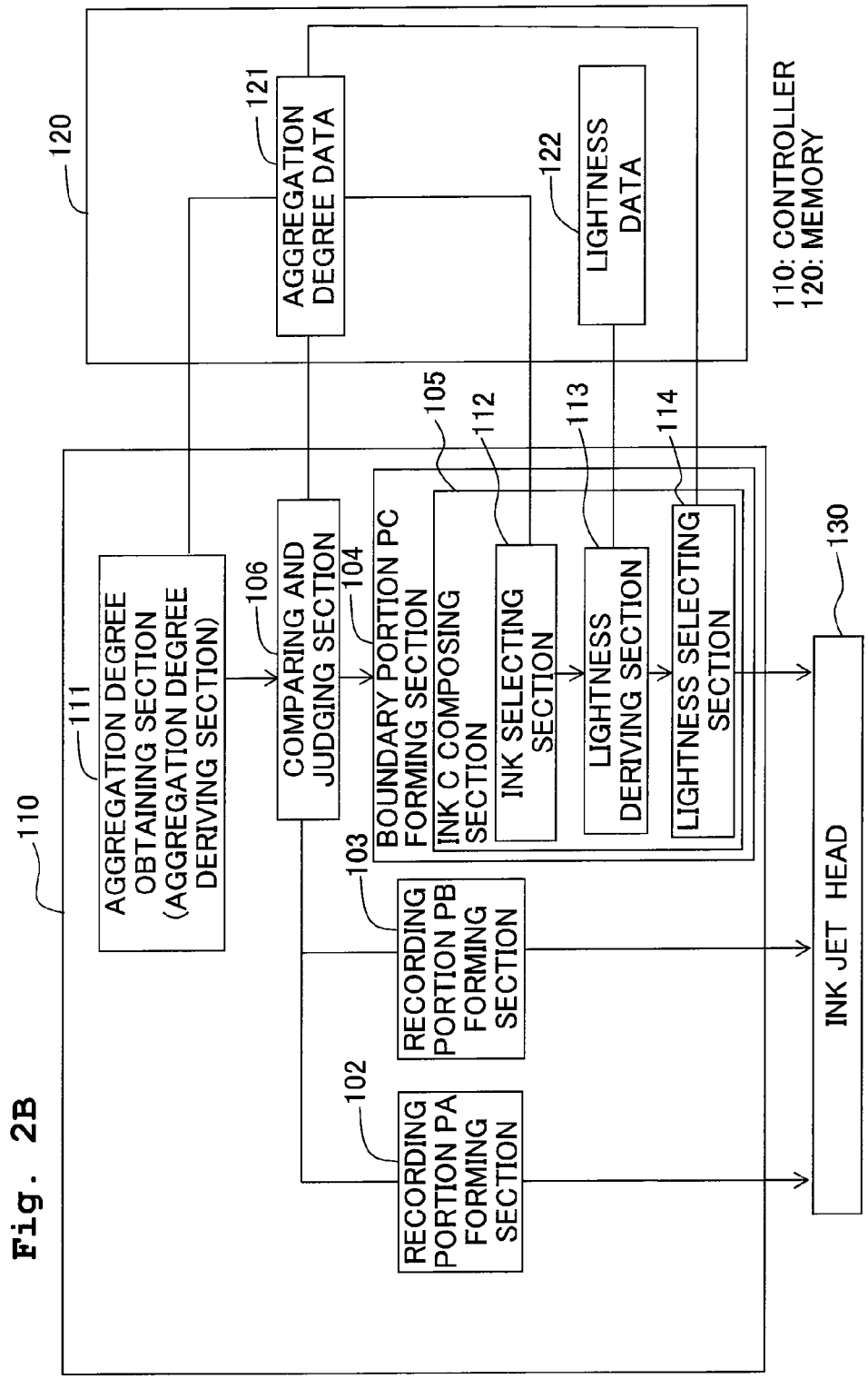
FIG. 2B shows a block diagram illustrating a relationship among a controller, a memory, and an ink jet head of an ink-jet recording apparatus in the second embodiment of the present invention.

The block diagram shown in FIG. 2B illustrates the relationship among the controller, the memory, and the ink jet head in an ink-jet recording apparatus of this embodiment. As shown in FIG. 2B, the aggregation degree data 121 and the lightness data 122 are stored in the memory 120. The controller 110 includes the aggregation degree obtaining section (aggregation degree deriving section) 111, the comparing and judging section 106, the recording portion PA forming section 102, the recording portion PB forming section 103, and the boundary portion PC forming section 104. Further, the boundary portion PC forming section 104 includes the ink C composing section 105, and the ink C composing section 105 includes the ink selecting section 112, the lightness deriving section 113, and the lightness selecting section 114. The aggregation degree deriving section 111, the ink selecting section 112, and the lightness selecting section 114 are connected to the aggregation degree data 121. The lightness deriving section 113 is connected to the lightness data 122.

In the present invention, for example, a hue table is exemplified as the lightness data. In the present invention, the L* value (see JIS Z 8729), which is based on, for example, the L*a*b color system (CIE 1976 (L*a*b) color system) normalized by Commission Internationale d'Eclairage (CIE) in 1976, may be adopted for the "lightness L*" of Condition (II) described above.

In the present invention, the lightness L* (A) may be, for example, the lightness of the ink A itself or the lightness of the recording portion PA. Similarly, in the present invention, the lightness L* (B) may be, for example, the lightness of the ink B itself or the lightness of the recording portion PB. The lightness of each of the ink A and the ink B itself can be measured in accordance with the transmission by using, for example, a commercially available spectrophotometer. The lightness of each of the recording portion PA and the recording portion PB can be measured in accordance with the reflection by using, for example, a commercially available spectrophotometer.

An example of the hue table is shown in Table 2. The hue table shown in Table 2 indicates the L* value, the a* value, and the b* value of the recording portion formed on the white (L*=93.6, a*=2.8, b*=−8.8) recording paper by using seven types of inks shown in the aggregation degree table in Table 1. The respective L* values, which are provided in the hue table of Table 2, represent the lightnesses of the recording portion formed by the respective inks. However, the hue table of Table 2 is shown merely by way of example. The recording medium, on which the recording portion PA, the recording portion PB, and the boundary portion PC are to be formed by the ink jet recording method and the ink-jet recording apparatus of this embodiment, is not limited to the white recording paper described above.

TABLE 2

| Ink | L* | a* | b* |
|---|---|---|---|
| Bk | 10 | −2 | −2 |
| Y | 86 | −1 | 87 |
| M | 52 | 82 | −9 |
| C | 68 | −15 | −42 |
| Y:M = 5:5 | 59 | 58 | 31 |
| Y:C = 5:5 | 88 | −87 | 83 |
| M:C = 5:5 | 50 | −2 | −45 |

The hue table shown in Table 2 describes only such cases that the constitutive ratio of the primary colors of the mixed ink is 5:5. However, the present invention is not limited thereto. It is also allowable to use those in which the L* value, the a* value, and the b* value are described for such cases that the constitutive ratios of the primary colors of the mixed inks are at multiple levels including, for example, 9:1 and 7:3.

The formation of the boundary portion PC, which is performed by the ink jet recording method and the ink jet recording apparatus of this embodiment, is carried out, for example, as follows by using the aggregation degree data shown in Table 1 and the lightness data shown in Table 2.

An explanation will be made about a case wherein the recording is performed while the two colors of the ink A and the ink B, which are composed differently from each other, are brought in contact with each other on the recording medium to form the recording portion PA and the recording portion PB. At first, as shown in FIGS. 2A and 2B, the aggregation degree G (AB) between the ink A and the ink B is derived with reference to the aggregation degree data 121 by the aggregation degree deriving section 111 (Step S1). For example, when the ink A is the black (Bk), and the ink B is the magenta (M), then the aggregation degree G (AB) is "8" in the same manner as in the first embodiment described above.

Subsequently, in the comparing and judging section 106, the aggregation degree G (AB) is compared with a predetermined value, i.e., threshold value 1 to judge whether the aggregation degree G (AB) is larger or smaller than the predetermined value, i.e., threshold value 1 (Step S1-3). If the aggregation degree G (AB) is smaller than the threshold value 1, the ink for composing the ink C is selected (Step S2). If the aggregation degree G (AB) is not less than the threshold value 1, then the ink C is not selected, and the recording portion PA and the recording portion PB are formed (Steps S6 and S7).

In this embodiment, the threshold value 1 is the maximum value capable of being provided for the aggregation degree G (AD) or the aggregation degree G (BD) in the same manner as in the first embodiment. In other words, when the ink A is the black (Bk), and the ink B is the magenta (M), then the threshold value 1 is "10". According to the aggregation degree data 121, the aggregation degree G (AB) is "8" which is smaller than "10". Therefore, the routine proceeds to the selection of the ink for composing the ink C (Step S2).

Subsequently, as shown in FIGS. 2A and 2B, the ink, which constitutes the ink C, is selected so that Condition (I) described above is satisfied, from the aggregation degree data 121 based on the derived aggregation degree G (AB) by the ink selecting section 112 (Step S2). For example, when the aggregation degree G (AB) is "8", the combinations of the inks, in which the aggregation degree exceeds "8", reside in "10" of the black (Bk) and the yellow (Y) and "9" of the black (Bk) and the mixed ink (Y:M=5:5). Therefore, the yellow (Y) or the mixed ink (Y:M=5:5) can be selected as the ink C which satisfies Condition (I) described above from the aggregation degree data 121.

Subsequently, as shown in FIGS. 2A and 2B, it is judged whether or not a plurality of the inks C exist (Step S3). If the plurality of the inks C do not exist (No), the recording of the boundary portion PC is carried out as described later on (Step S4). If the plurality of the inks C exist (Yes), the lightness L* (A) of the ink A and the lightness L* (B) of the ink B are derived with reference to the lightness data 122 by the lightness deriving section 113 (Step S3-1). Subsequently, the ink, which constitutes the ink C, is selected to satisfy Condition (II) described above from the aggregation degree data 121 based on the derived aggregation degree G (AB), the derived lightness L* (A), and the derived lightness L* (B) by the lightness selecting section 114 (Step S3-2). For example, when the ink A is the black (Bk), and the ink B is the magenta (M), then the plurality of the inks C exist, because the two of the yellow (Y) and the mixed ink (Y:M=5:5) are selected. Therefore, when the lightness L* (A) and the lightness L* (B) of the black (Bk) and the magenta (M) are derived respectively from the lightness data 122, then the lightness L* (A) is "10", and the lightness L* (B) is "52". This falls under the case of "lightness L* (A)<lightness L* (B)" of the expression (3) in accordance with Condition (II) described above. In this case, it is necessary that the expression (1) "aggregation degree G (AC)>aggregation degree G (AB)" should be satisfied. The aggregation degree G (AB) is "8" in this case. Therefore, the combinations of the inks, in which the aggregation degree exceeds "8", reside in "10" of the black (Bk) and the yellow (Y) and "9" of the black (Bk) and the mixed ink (Y:M=5:5), both of which satisfy the expression (1). Therefore, the yellow (Y) or the mixed ink (Y:M=5:5) can be selected as the ink C which satisfies Condition (II) described above from the aggregation degree data 121. When a plurality of inks C are selected, then the ink C can be limited to one ink by using Condition (III) as described later on, or the ink C may be limited to one ink in accordance with any other condition.

Subsequently, as shown in FIGS. 2A and 2B, the selected ink is discharged to carry out the recording of the boundary portion PC by the ink jet head 130 based on the instruction from the boundary portion PC forming section 104 including the ink selecting section 112 and the lightness selecting section 114 (Step S4). When the yellow (Y) is selected when the four types of single color inks of yellow (Y), magenta (M), cyan (C), and black (Bk) are accommodated in the ink-accommodating section of the ink jet recording apparatus in the same manner as in the first embodiment described above, for example, the yellow (Y) may be discharged to the forming portion of the boundary portion PC. When the mixed ink (Y:M=5:5) is selected in the ink-jet recording apparatus, then the yellow (Y) and the magenta (M) may be discharged respectively at a ratio of 5:5, and the mixed ink (Y:M=5:5) may be prepared on the forming portion of the boundary portion PC. In this embodiment, the yellow (Y), which is the single color ink with the simple discharge mechanism, is selected as the ink C, and the ink is discharged to the boundary portion PC forming portion.

Subsequently, the recording portion PA is formed by using the ink A based on the instruction from the recording portion PA forming section 102 (Step S6), and the recording portion PB is formed by using the ink B based on the instruction from the recording portion PB forming section 103 (Step S7).

In this embodiment, the lightness is derived after the derivation of the aggregation degree. However, the present invention is not limited thereto. Any one of them may be carried out previously irrelevant to the order or sequence of the derivation of the aggregation degree and the derivation of the lightness. Alternatively, the both may be carried out simultaneously as in the sixth embodiment described later on.

This embodiment is illustrative of the case in which the lightness L* (A) and the lightness L* (B) are different from each other by way of example. However, the lightness L* (A) and the lightness L* (B) are identical with each other in some cases. If a plurality of the inks C exist, and the lightness L* (A) and the lightness L* (B) are identical to one another, then the range of selection of the ink C can be further narrowed when Condition (II') and Condition (II") described below are adopted.

Condition (II'): if the following expression (3') is satisfied, the expression (1) described above is satisfied, or if the following expression (4) is satisfied, the expression (2) described above is satisfied.

$$L^*(A) \leq L^*(B) \tag{3'}$$

$$L^*(A) > L^*(B) \tag{4}$$

Condition (II"): if the following expression (3) is satisfied, the expression (1) described above is satisfied, or if the following expression (4') is satisfied, the expression (2) described above is satisfied.

$$L^*(A) < L^*(B) \tag{3}$$

$$L^*(A) \leq L^*(B) \tag{4'}$$

Third Embodiment

Figure 3A:
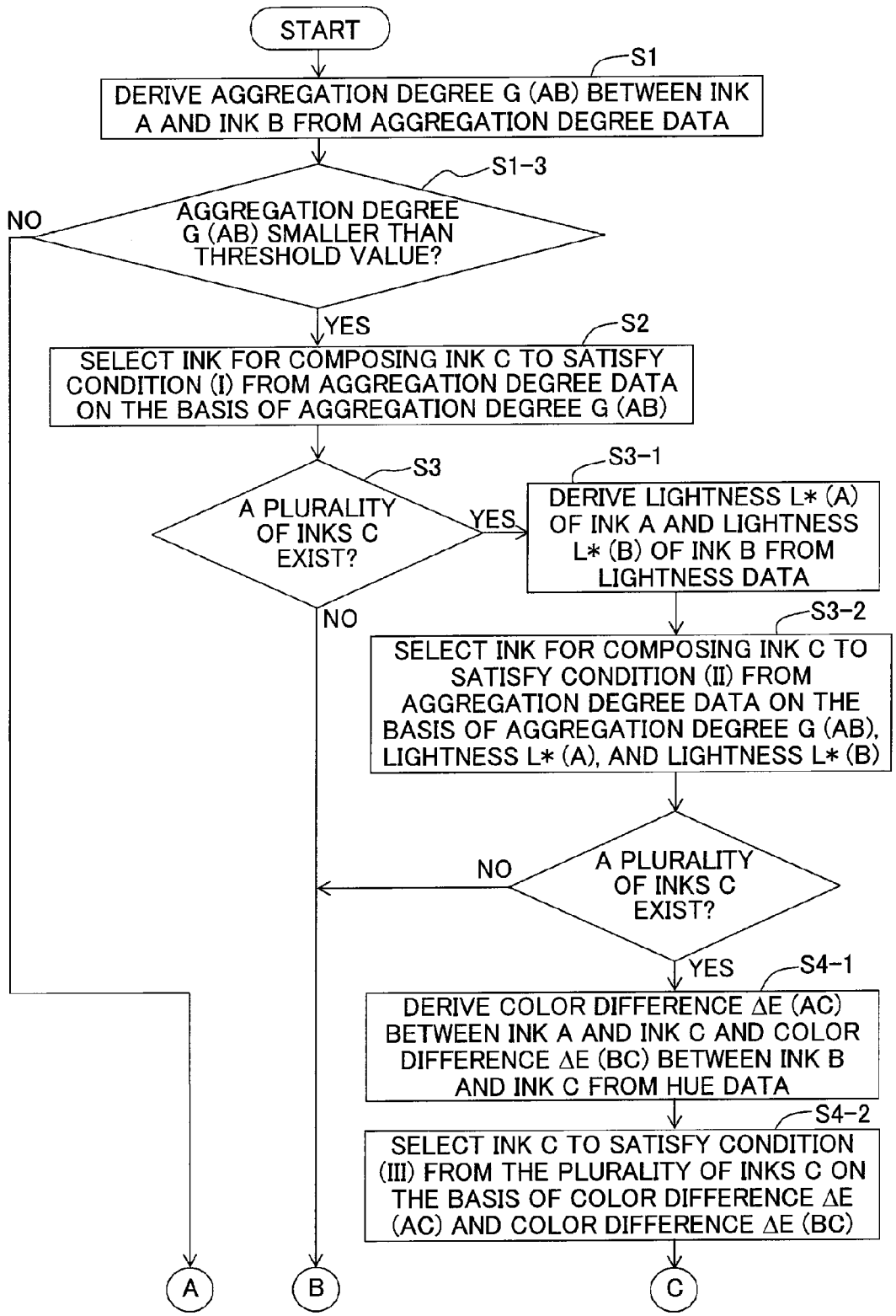
FIGS. 3A and 3B show a flow chart in relation to a third embodiment of the present invention.
Figure 3B:
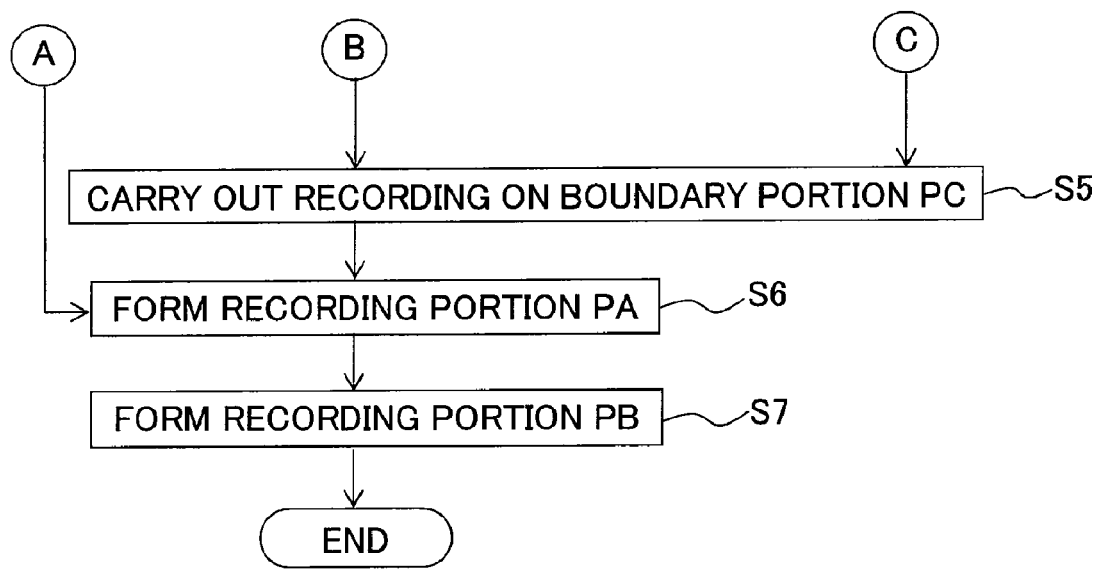
Figure 3C:
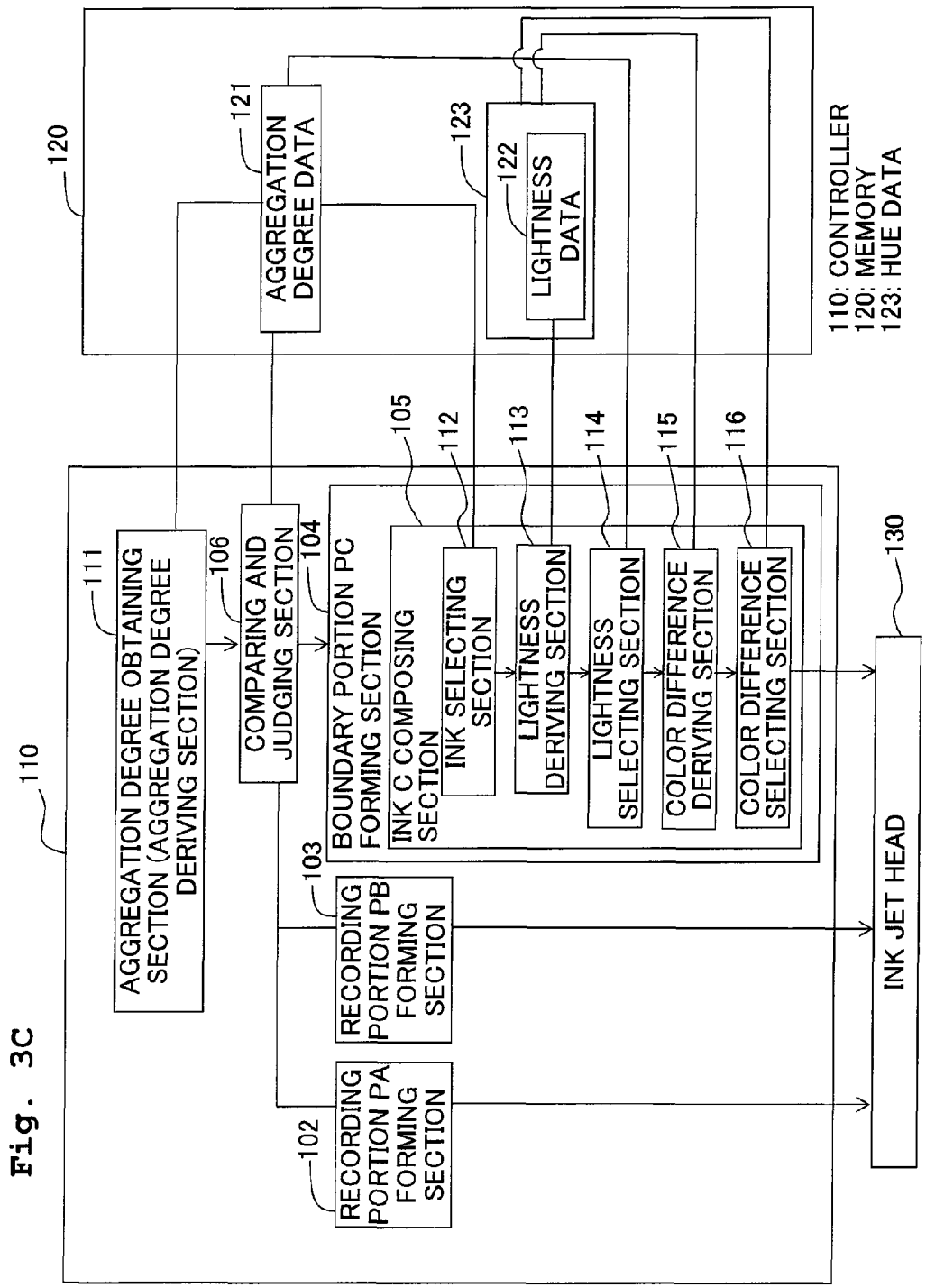
FIG. 3C shows a block diagram illustrating a relationship among a controller, a memory, and an ink jet head of an ink-jet recording apparatus in the third embodiment of the present invention.

The block diagram shown in FIG. 3c illustrates the relationship among the controller, the memory, and the ink jet head in an ink-jet recording apparatus of this embodiment. As shown in FIG. 3c, the aggregation degree data 121 and the hue data 123 are stored in the memory 120. The controller 110 includes the aggregation degree obtaining section (aggregation degree deriving section) 111, the comparing and judging section 106, the recording portion PA forming section 102, the recording portion PB forming section 103, and the boundary portion PC forming section 104. Further, the boundary portion PC forming section 104 includes the ink C composing section 105, and the ink C composing section 105 includes the ink selecting section 112, the lightness deriving section 113, the lightness selecting section 114, the color difference deriving section 115, and the color difference selecting section 116. The lightness data 122 is included in the hue data 123.

The aggregation degree deriving section 111, the ink selecting section 112, and the lightness selecting section 114 are connected to the aggregation degree data 121. The lightness deriving section 113 is connected to the lightness data 122. The color difference deriving section 115 and the color difference selecting section 116 are connected to the hue data 123.

In the present invention, for example, a hue table is exemplified as the hue data. In the present invention, the value (see JIS Z 8729), which is calculated based on, for example, the L*a*b color system (CIE 1976 (L*a*b) color system) normalized by Commission Internationale d'Eclairage (CIE) in 1976, may be adopted for the "color difference ΔE" of Condition (III) described above.

$$\Delta E = \{(\Delta L^*)^2 + (\Delta a^*)^2 + (\Delta b^*)^2\}^{1/2}$$

ΔL*: difference in L* value between two types of inks
Δa*: difference in a* value between two types of inks
Δb*: difference in b* value between two types of inks In the present invention, for example, the color difference ΔE (AC) may be calculated from the L* values, the a* values, and the b* values of the ink A and the ink C themselves, or the color difference ΔE (AC) may be calculated from the L* values, the a* values, and the b* values of the recording portion PA and the boundary portion PC. Similarly, in the present invention, for example, the color difference ΔE (BC) may be calculated from the L* values, the a* values, and the b* values of the ink B and the ink C themselves, or the color difference ΔE (BC) may be calculated from the L* values, the a* values, and the b* values of the recording portion PB and the boundary portion PC. The L* values, the a* values, and the b* values of the ink A, the ink B, and the ink C themselves can be measured, for example, in accordance with the transmission by using a commercially available spectrophotometer. Further, the L* values, the a* values, and the b* values of the recording portion PA, the recording portion PB, and the boundary portion PC can be measured, for example, in accordance with the reflection by using a commercially available spectrophotometer.

The ink-jet recording method of this embodiment is carried out, for example, as follows by using the aggregation degree data shown in Table 1 and the hue data shown in Table 2.

An explanation will be made about a case wherein the recording is performed while the two colors of the ink A and the ink B, which are composed differently from each other, are brought in contact with each other on the recording medium to form the recording portion PA and the recording portion PB. At first, as shown in FIGS. 3A, 3B and 3C, the aggregation degree G (AB) between the ink A and the ink B is derived with reference to the aggregation degree data 121 by the aggregation degree deriving section 111 (Step S1). For example, when the ink A is the black (Bk), and the ink B is the magenta (M), then the aggregation degree G (AB) is "8" in the same manner as in the first embodiment described above.

Subsequently, in the comparing and judging section 106, the aggregation degree G (AB) is compared with a predetermined value, i.e., threshold value 1 to judge whether the aggregation degree G (AB) is larger or smaller than the predetermined value, i.e., threshold value 1 (Step S1-3). If the aggregation degree G (AB) is smaller than the threshold value 1, the ink for composing the ink C is selected (Step S2). If the aggregation degree G (AB) is not less than the threshold value 1, then the ink C is not selected, and the recording portion PA and the recording portion PB are formed (Steps S6 and S7).

In this embodiment, the threshold value 1 is the maximum value capable of being provided for the aggregation degree G (AD) or the aggregation degree G (BD) in the same manner as in the first embodiment. In other words, when the ink A is the black (Bk), and the ink B is the magenta (M), then the threshold value 1 is "10". According to the aggregation degree data 121, the aggregation degree G (AB) is "8" which is smaller than "10". Therefore, the routine proceeds to the selection of the ink for composing the ink C (Step S2).

Subsequently, as shown in FIGS. 3A, 3B and 3C, the ink, which constitutes the ink C, is selected so that Condition (I) described above is satisfied, from the aggregation degree data 121 based on the derived aggregation degree G (AB) by the ink selecting section included in the boundary portion PC forming section 104 (Step S2). For example, when the aggregation degree G (AB) is "8", the combinations of the inks, in which the aggregation degree exceeds "8", reside in "10" of the black (Bk) and the yellow (Y) and "9" of the black (Bk) and the mixed ink (Y:M=5:5). Therefore, the yellow (Y) or the mixed ink (Y:M=5:5) can be selected as the ink C which satisfies Condition (I) described above from the aggregation degree data 121.

Subsequently, as shown in FIGS. 3A, 3B and 3C, it is judged whether or not a plurality of the inks C exist (Step S3). If the plurality of the inks C do not exist (No), the recording of the boundary portion PC is carried out as described later on (Step S5). If the plurality of the inks C exist (Yes), the lightness L* (A) of the ink A and the lightness L* (B) of the ink B are derived with reference to the lightness data 122 by the lightness deriving section 113 (Step S3-1). Subsequently, the ink, which constitutes the ink C, is selected to satisfy Condition (II) described above from the aggregation degree data 121 based on the derived aggregation degree G (AB), the derived lightness L* (A), and the derived lightness L* (B) by the lightness selecting section 114 (Step S3-2). For example, when the ink A is the black (Bk), and the ink B is the magenta (M), then the plurality of the inks C exist, because the two of the yellow (Y) and the mixed ink (Y:M=5:5) are selected. Therefore, when the lightness L* (A) and the lightness L* (B) of the black (Bk) and the magenta (M) are derived respectively from the lightness data 122, then the lightness L* (A) is "10", and the lightness L* (B) is "52". This falls under the case of "lightness L* (A)<lightness L* (B)" of the expression (3) in accordance with Condition (II) described above. In this case, it is necessary that the expression (1) "aggregation degree G (AC)>aggregation degree G (AB)" should be satisfied. The aggregation degree G (AB) is "8" in this case. Therefore, the combinations of the inks, in which the aggregation degree exceeds "8", reside in "10" of the black (Bk) and the yellow (Y) and "9" of the black (Bk) and the mixed ink (Y:M=5:5), both of which satisfy the expression (1). Therefore, the yellow (Y) or the mixed ink (Y:M=5:5) can be selected as the ink C which satisfies Condition (II) described above from the aggregation degree data 121.

Subsequently, as shown in FIGS. 3A, 3B and 3C, it is judged whether or not a plurality of the inks C exist (Step S4). If the plurality of the inks C do not exist (No), the recording of the boundary portion PC is carried out as described later on (Step S5). If the plurality of the inks C exist (Yes), the color difference ΔE (AC) between the ink A and the ink C and the color difference ΔE (BC) between the ink B and the ink C are derived from the hue data 123 by the color difference deriving section 115 (Step S4-1). Subsequently, one ink C, which satisfies Condition (III) described above, is selected in accordance with the derived color difference ΔE (AC) and the derived color difference ΔE (BC) with reference to the hue data 123 by the color difference selecting section 116 (Step S4-2). For example, when the ink A is the black (Bk), and the ink B is the magenta (M), then the plurality of the inks C exist, because the two of the yellow (Y) and the mixed ink (Y:M=5:5) are selected. Therefore, when the color difference ΔE (AC) and the color difference ΔE (BC) of the yellow (Y) and the mixed ink (Y:M=5:5) are derived respectively from the hue data 123, the following result is obtained. Therefore, the mixed ink (Y:M=5:5) is selected, because the minimum color difference is the color difference ΔE (BC)=47.17 in the case of the mixed ink (Y:M=5:5).

In the case of the yellow (Y):
color difference ΔE (AC)=117.04
color difference ΔE (BC)=131.38
In the case of the mixed ink (Y:M=5:5):
color difference ΔE (AC)=84.20
color difference ΔE (BC)=47.17

Subsequently, as shown in FIGS. 3A, 3B and 3C, the selected ink is discharged to carry out the recording of the boundary portion PC by the ink jet head 130 based on the instruction from the boundary portion PC forming section 104 including the ink selecting section 112, the lightness selecting section 114, and the color difference selecting section 116 (Step S5). When the four types of single color inks of yellow (Y), magenta (M), cyan (C), and black (Bk) are accommodated in the ink-accommodating section of the ink-jet recording apparatus in the same manner as in the first embodiment described above, and the mixed ink (Y:M=5:5) is selected, then the yellow (Y) and the magenta (M) may be discharged respectively at a ratio of 5:5 to prepare the mixed ink (Y:M=5:5) on the forming portion of the boundary portion PC.

Subsequently, the recording portion PA is formed by using the ink A based on the instruction from the recording portion PA forming section 102 (Step S6), and the recording portion PB is formed by using the ink B based on the instruction from the recording portion PB forming section 103 (Step S7).

In this embodiment, the lightness is derived after the derivation of the aggregation degree. However, the present invention is not limited thereto. Any one of them may be carried out previously irrelevant to the order or sequence of the derivation of the aggregation degree and the derivation of the lightness. Alternatively, the both may be carried out simultaneously.

In this embodiment, the color difference is derived after the derivation of the lightness. However, the present invention is not limited thereto. Any one of them may be carried out previously irrelevant to the order or sequence of the derivation of the lightness and the derivation of the color difference. Alternatively, the both may be carried out simultaneously.

Fourth Embodiment

Figure 4A:
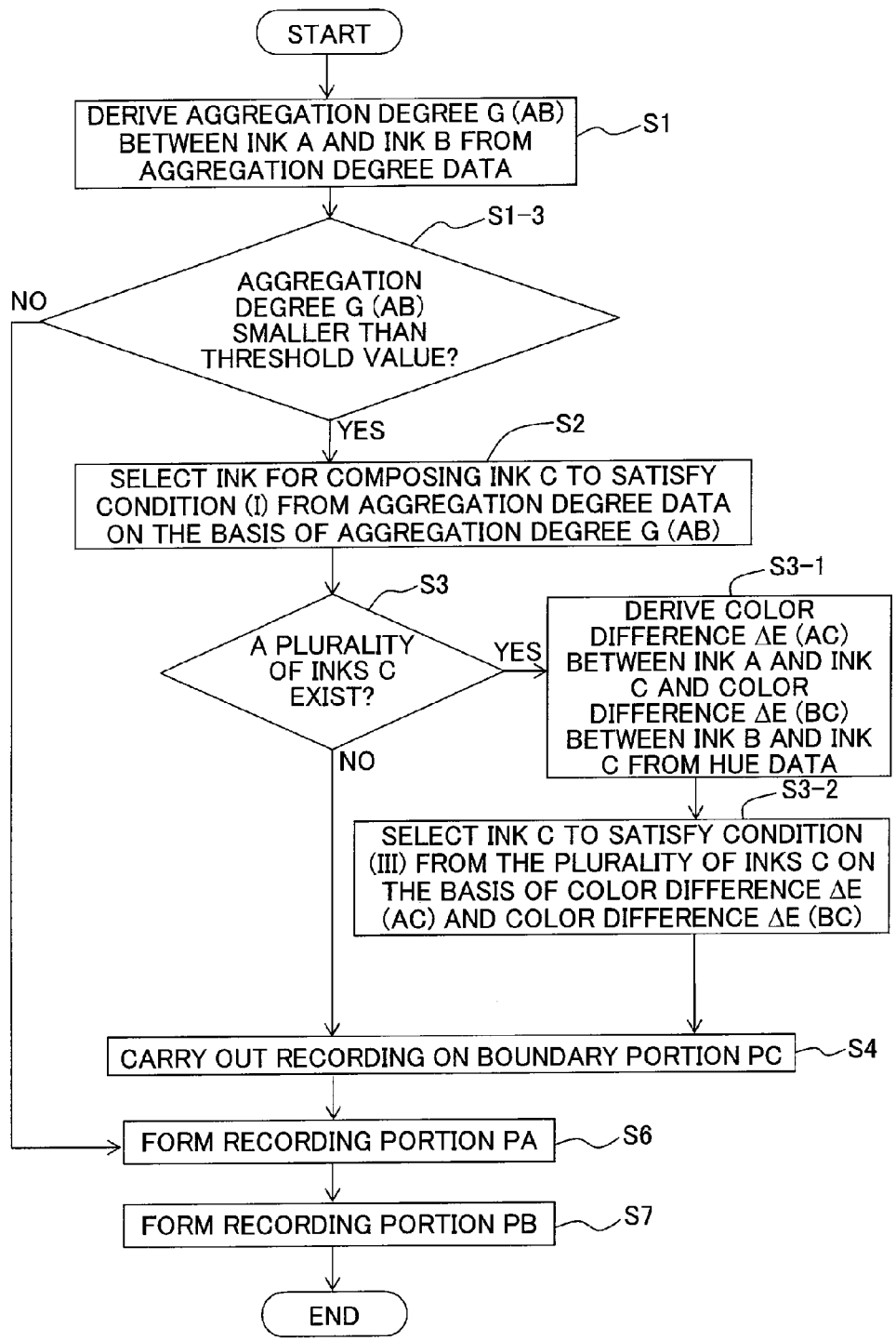
FIG. 4A shows a flow chart in relation to a fourth embodiment of the present invention.
Figure 4B:
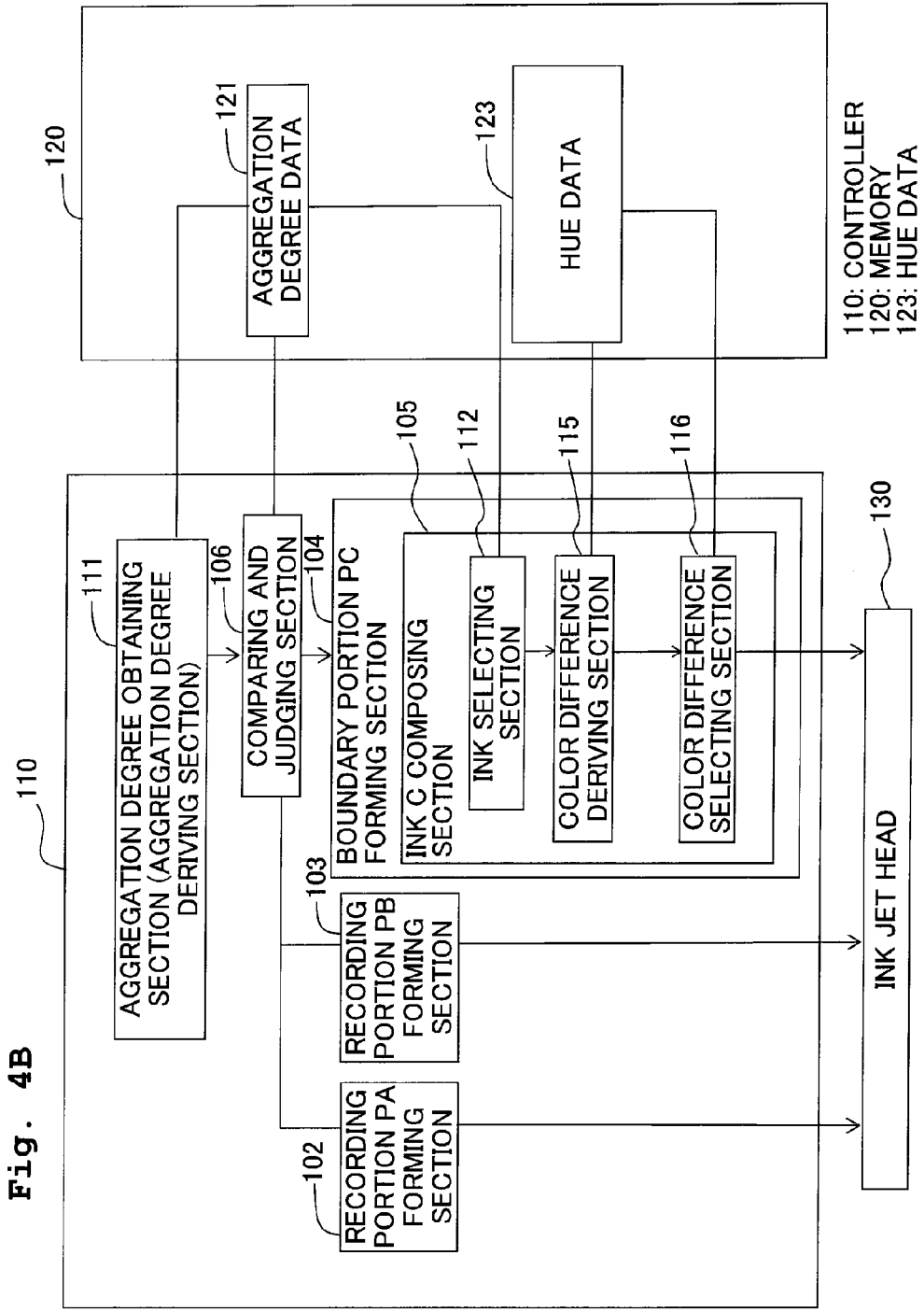
FIG. 4B shows a block diagram illustrating a relationship among a controller, a memory, and an ink jet head of an ink-jet recording apparatus in the fourth embodiment of the present invention.

The block diagram shown in FIG. 4B illustrates the relationship among the controller, the memory, and the ink jet head in an ink-jet recording apparatus of this embodiment. As shown in FIG. 4B, the aggregation degree data 121 and the hue data 123 are stored in the memory 120. The controller 110 includes the aggregation degree obtaining section (aggregation degree deriving section) 111, the comparing and judging section 106, the recording portion PA forming section 102, the recording portion PB forming section 103, and the boundary portion PC forming section 104. Further, the boundary portion PC forming section 104 includes the ink C composing section 105, and the ink C composing section 105 includes the ink selecting section 112, the color difference deriving section 115, and the color difference selecting section 116. The aggregation degree deriving section 111 and the ink selecting section 112 are connected to the aggregation degree data 121. The color difference deriving section 115 and the color difference selecting section 116 are connected to the hue data 123.

The ink-jet recording method of this embodiment is carried out, for example, as follows by using the aggregation degree data shown in Table 1 and the hue data shown in Table 2.

At first, as shown in FIGS. 4A and 4B, the aggregation degree G (AB) between the ink A and the ink B is derived with reference to the aggregation degree data 121 by the aggregation degree deriving section 111 (Step S1). For example, when the ink A is the black (Bk), and the ink B is the magenta (M), then the aggregation degree G (AB) is "8" in the same manner as in the first embodiment described above.

Subsequently, in the comparing and judging section 106, the aggregation degree G (AB) is compared with a predetermined value, i.e., threshold value 1 to judge whether the aggregation degree G (AB) is larger or smaller than the predetermined value, i.e., threshold value 1 (Step S1-3). If the aggregation degree G (AB) is smaller than the threshold value 1, the ink for composing the ink C is selected (Step S2). If the aggregation degree G (AB) is not less than the threshold value 1, then the ink C is not selected, and the recording portion PA and the recording portion PB are formed (Steps S6 and S7).

In this embodiment, the threshold value 1 is the maximum value capable of being provided for the aggregation degree G (AD) or the aggregation degree G (BD) in the same manner as in the first embodiment. In other words, when the ink A is the black (Bk), and the ink B is the magenta (M), then the threshold value 1 is "10". According to the aggregation degree data 121, the aggregation degree G (AB) is "8" which is smaller than "10". Therefore, the routine proceeds to the selection of the ink for composing the ink C (Step S2).

Subsequently, as shown in FIGS. 4A and 4B, the ink, which constitutes the ink C, is selected so that Condition (I) described above is satisfied, from the aggregation degree data 121 based on the derived aggregation degree G (AB) by the ink selecting section 112 (Step S2). For example, when the aggregation degree G (AB) is "8", the combinations of the inks, in which the aggregation degree exceeds "8", reside in "10" of the black (Bk) and the yellow (Y) and "9" of the black (Bk) and the mixed ink (Y:M=5:5). Therefore, the yellow (Y) or the mixed ink (Y:M=5:5) can be selected as the ink C which satisfies Condition (I) described above from the aggregation degree data 121.

Subsequently, as shown in FIGS. 4A and 4B, it is judged whether or not a plurality of the inks C exist (Step S3). If the plurality of the inks C do not exist (No), the recording of the boundary portion PC is carried out as described later on (Step S4). If the plurality of the inks C exist (Yes), the color difference ΔE (AC) between the ink A and the ink C and the color difference ΔE (BC) between the ink B and the ink C are derived from the hue data 123 by the color difference deriving section 115 (Step S3-1). Subsequently, one ink C, which satisfies Condition (III) described above, is selected in accordance with the derived color difference ΔE (AC) and the derived color difference ΔE (BC) with reference to the hue data 123 by the color difference selecting section 116 (Step S3-2). For example, when the ink A is the black (Bk), and the ink B is the magenta (M), then the plurality of the inks C exist, because the two of the yellow (Y) and the mixed ink (Y:M=5:5) are selected. Therefore, when the color difference ΔE (AC) and the color difference ΔE (BC) of the yellow (Y) and the mixed ink (Y:M=5:5) are derived respectively from the hue data 123, the following result is obtained. Therefore, the mixed ink (Y:M=5:5) is selected, because the minimum color difference is the color difference ΔE (BC)=47.17 in the case of the mixed ink (Y:M=5:5).

In the case of the yellow (Y):
color difference ΔE (AC)=117.04
color difference ΔE (BC)=131.38
In the case of the mixed ink (Y:M=5:5):
color difference ΔE (AC)=84.20
color difference ΔE (BC)=47.17

Subsequently, as shown in FIGS. 4A and 4B, the selected ink is discharged to carry out the recording of the boundary portion PC by the ink jet head 130 based on the instruction from the boundary portion PC forming section 104 including the ink selecting section 112 and the color difference selecting section 116 (Step S4). When the four types of single color inks of yellow (Y), magenta (M), cyan (C), and black (Bk) are accommodated in the ink-accommodating section of the ink jet recording apparatus in the same manner as in the first embodiment described above, and the mixed ink (Y:M=5:5) is selected, then the yellow (Y) and the magenta (M) may be discharged respectively at a ratio of 5:5 to prepare the mixed ink (Y:M=5:5) on the forming portion of the boundary portion PC.

Subsequently, the recording portion PA is formed by using the ink A based on the instruction from the recording portion PA forming section 102 (Step S6), and the recording portion PB is formed by using the ink B based on the instruction from the recording portion PB forming section 103 (Step S7).

Fifth Embodiment

Figure 5A:
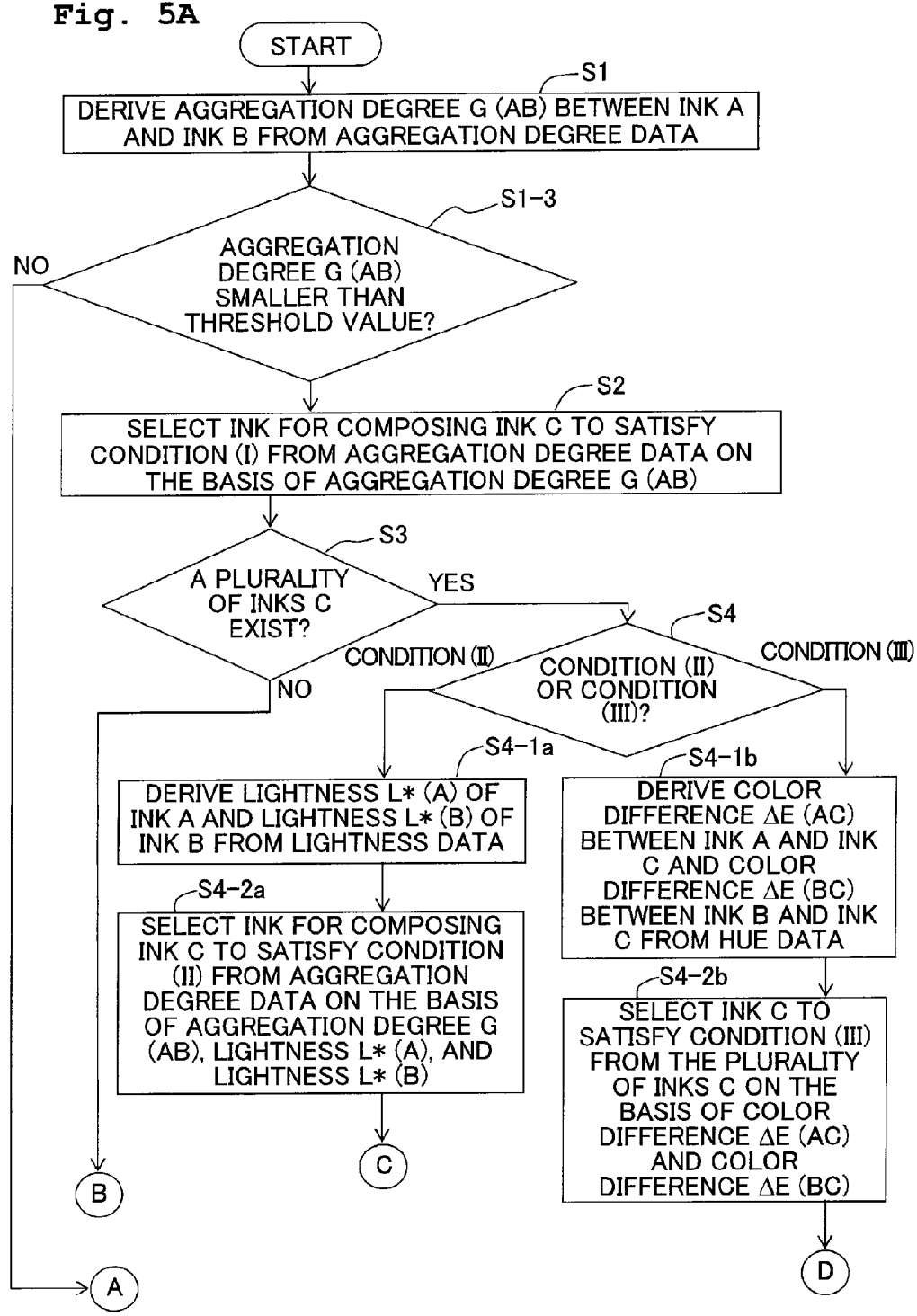
FIGS. 5A and 5B show a flow chart in relation to a fifth embodiment of the present invention.
Figure 5B:
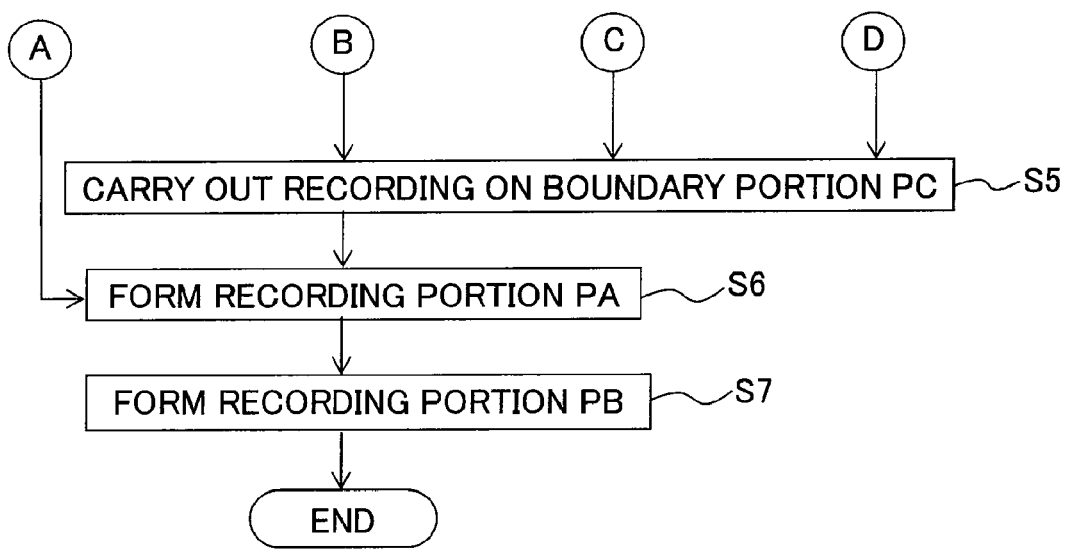
Figure 5C:
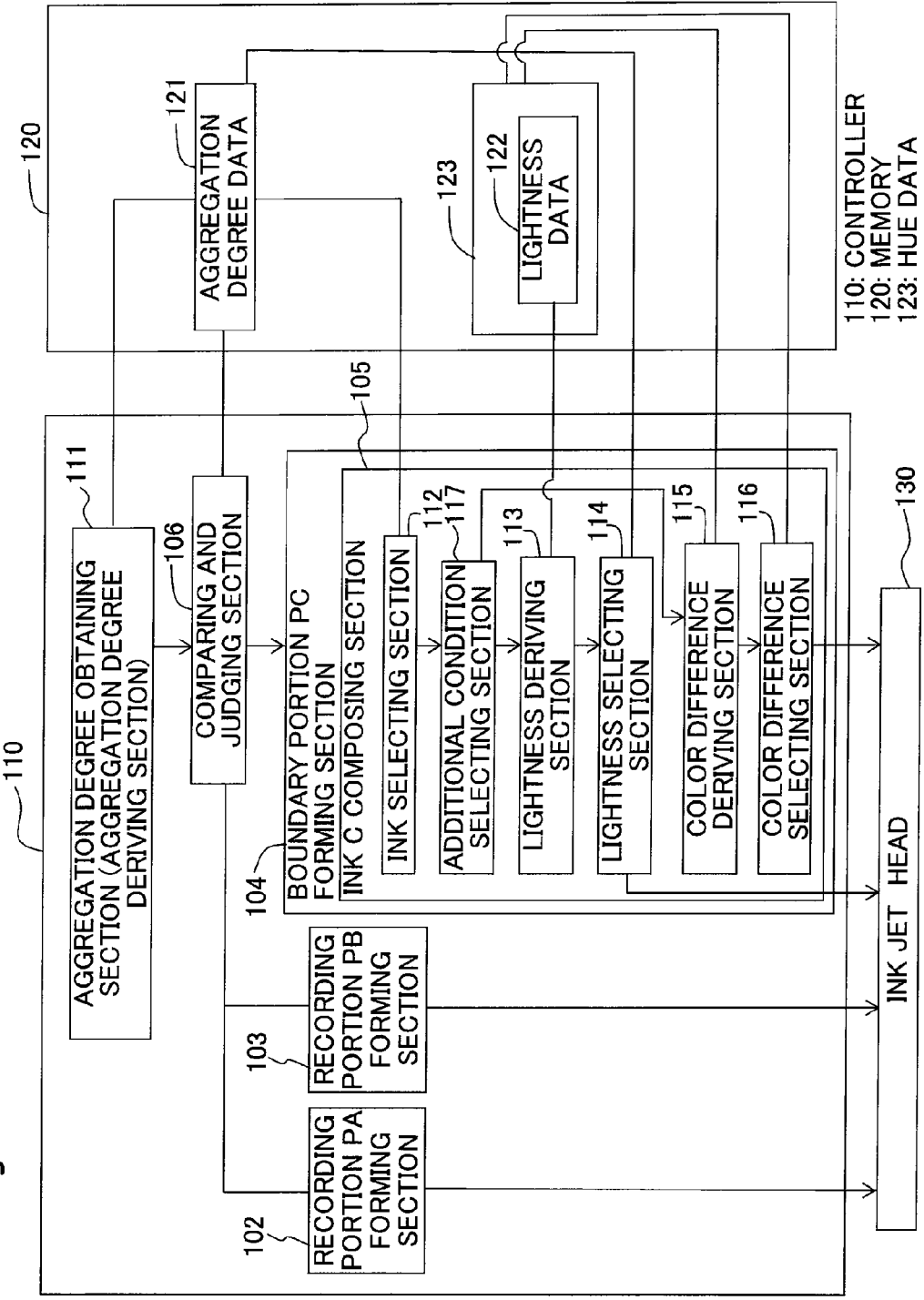
FIG. 5C shows a block diagram illustrating a relationship among a controller, a memory, and an ink jet head of an ink jet recording apparatus in the fifth embodiment of the present invention.

The block diagram shown in FIG. 5C illustrates the relationship among the controller, the memory, and the ink jet head in an ink jet recording apparatus of this embodiment. As shown in FIG. 5C, the aggregation degree data 121 and the hue data 123 are stored in the memory 120. The controller 110 includes the aggregation degree obtaining section (aggregation degree deriving section) 111, the comparing and judging section 106, the recording portion PA forming section 102, the recording portion PB forming section 103, and the boundary portion PC forming section 104. Further, the boundary portion PC forming section 104 includes the ink C composing section 105, and the ink C composing section 105 includes the ink selecting section 112, the additional condition selecting section 117, the lightness deriving section 113, the lightness selecting section 114, the color difference deriving section 115, and the color difference selecting section 116. The lightness data 122 is included in the hue data 123. The aggregation degree deriving section 111, the ink selecting section 112, and the lightness selecting section 114 are connected to the aggregation degree data 121. The lightness deriving section 113 is connected to the lightness data 122. The color difference deriving section 115 and the color difference selecting section 116 are connected to the hue data 123.

The ink-jet recording method of this embodiment is carried out, for example, as follows by using the aggregation degree data shown in Table 1 and the hue data shown in Table 2.

An explanation will be made about a case wherein the recording is performed while the two colors of the ink A and the ink B, which are composed differently from each other, are brought in contact with each other on the recording medium to form the recording portion PA and the recording portion PB. At first, as shown in FIGS. 5A, 5B and 5C, the aggregation degree G (AB) between the ink A and the ink B is derived with reference to the aggregation degree data 121 by the aggregation degree deriving section 111 (Step S1). For example, when the ink A is the black (Bk), and the ink B is the magenta (M), then the aggregation degree G (AB) is "8" in the same manner as in the first embodiment described above.

Subsequently, in the comparing and judging section 106, the aggregation degree G (AB) is compared with a predetermined value, i.e., threshold value 1 to judge whether the aggregation degree G (AB) is larger or smaller than the predetermined value, i.e., threshold value 1 (Step S1-3). If the aggregation degree G (AB) is smaller than the threshold value 1, the ink for composing the ink C is selected (Step S2). If the aggregation degree G (AB) is not less than the threshold value 1, then the ink C is not selected, and the recording portion PA and the recording portion PB are formed (Steps S6 and S7).

In this embodiment, the threshold value 1 is the maximum value capable of being provided for the aggregation degree G (AD) or the aggregation degree G (BD) in the same manner as in the first embodiment. In other words, when the ink A is the black (Bk), and the ink B is the magenta (M), then the threshold value 1 is "10". According to the aggregation degree data 121, the aggregation degree G (AB) is "8" which is smaller than "10". Therefore, the routine proceeds to the selection of the ink for composing the ink C (Step S2).

Subsequently, as shown in FIGS. 5A, 5B and 5C, the ink, which constitutes the ink C, is selected so that Condition (I) described above is satisfied, from the aggregation degree data 121 based on the derived aggregation degree G (AB) by the ink selecting section 112 (Step S2). For example, when the aggregation degree G (AB) is "8", the combinations of the inks, in which the aggregation degree exceeds "8", reside in "10" of the black (Bk) and the yellow (Y) and "9" of the black (Bk) and the mixed ink (Y:M=5:5). Therefore, the yellow (Y) or the mixed ink (Y:M=5:5) can be selected as the ink C which satisfies Condition (I) described above from the aggregation degree data 121.

Subsequently, as shown in FIGS. 5A, 5B and 5C, it is judged whether or not a plurality of the inks C exist (Step S3). If the plurality of the inks C do not exist (No), the recording of the boundary portion PC is carried out as described later on (Step S5). If the plurality of the inks C exist (Yes), it is judged whether Condition (II) or Condition (III) is utilized, by the additional condition selecting section 117 (Step S4). For example, when the ink A is the black (Bk) and the ink B is the magenta (M), then the plurality of the inks C exist, because the two of the yellow (Y) and the mixed ink (Y:M=5:5) are selected. Therefore, it is judged whether Condition (II) or Condition (III) is utilized, by the additional condition selecting section 117. The judging technique to judge whether Condition (II) or Condition (III) is utilized, which is adopted for the additional condition selecting section 117, is not specifically limited. It is allowable to adopt any technique. The judging technique includes, for example, a technique in which it is judged that Condition (II) is used if the maximum difference between the aggregation degree G (AC) or the aggregation degree G (BC) and the aggregation degree G (AB) exceeds a predetermined value j. Specifically, for example, if the aggregation degree G (AB) is "2", the maximum value of the aggregation degree G (AC) is "9", and j=5 is given, then it is judged that Condition (II) is utilized. The judging technique also includes, for example, a technique in which Condition (III) is utilized, for example, if an ink having a color of the same type as that of the ink A or the ink B is included in the plurality of the inks C. Specifically, if the ink A is the black (Bk), the ink B is the magenta (M), and the light magenta (LM) having the color of the same type as that of the ink B is included in the plurality of the inks C, then it is judged that Condition (III) described above is utilized.

If Condition (II) is utilized, the lightness L* (A) of the ink A and the lightness L* (B) of the ink B are derived with reference to the lightness data 122 by the lightness deriving section 113 (Step S4-1a). For example, when the ink A is the black (Bk), and the ink B is the magenta (M), then the lightness L* (A) is "10", and the lightness L* (B) is "52". Subsequently, the ink, which constitutes the ink C, is selected to satisfy Condition (II) described above from the aggregation degree data 121 based on the derived aggregation degree G (AB), the derived lightness L* (A), and the derived lightness L* (B) by the lightness selecting section 114 (Step S4-2a). For example, when the ink A is the black (Bk), and the ink B is the magenta (M), then the lightness L* (A) is "10", and the lightness L* (B) is "52", which falls under the case of "lightness L* (A)<lightness L* (B)" of the expression (3) described above in accordance with Condition (II) described above. In this case, it is necessary that "aggregation degree G (AC) >aggregation degree G (AB)" of the expression (1) should be satisfied. The aggregation degree G (AB) is "8" in this case. Therefore, the combinations of the inks, in which the aggregation degree exceeds "8", reside in "10" of the black (Bk) and the yellow (Y) and "9" of the black (Bk) and the mixed ink (Y:M=5:5), both of which satisfy the expression (1). Therefore, the yellow (Y) or the mixed ink (Y:M=5:5) can be selected as the ink C which satisfies Condition (I) and Condition (II) described above from the aggregation degree data 121.

On the other hand, when Condition (III) is utilized, the color difference ΔE (AC) between the ink A and the ink C and the color difference ΔE (BC) between the ink B and the ink C are derived from the hue data 123 by the color difference deriving section 115 (Step S4-1b). Subsequently, one ink C, which satisfies Condition (III) described above, is selected in accordance with the derived color difference ΔE (AC) and the derived color difference ΔE (BC) with reference to the hue data 123 by the color difference selecting section 116 (Step S4-2b). For example, when the ink A is the black (Bk), and the ink B is the magenta (M), then the following result is obtained when the color difference ΔE (AC) and the color difference ΔE (BC) of the yellow (Y) and the mixed ink (Y:M=5:5) are derived respectively from the hue data 123. Therefore, the mixed ink (Y:M=5:5) is selected, because the minimum color difference is the color difference ΔE (BC)=47.17 in the case of the mixed ink (Y:M=5:5).

In the case of the yellow (Y):
color difference ΔE (AC)=117.04
color difference ΔE (BC)=131.38
In the case of the mixed ink (Y:M=5:5):
color difference ΔE (AC)=84.20
color difference ΔE (BC)=47.17

Subsequently, as shown in FIGS. 5A, 5B and 5C, the selected ink is discharged to carry out the recording of the boundary portion PC by the ink jet head 130 based on the instruction from the boundary portion PC forming section 104 including the ink selecting section 112, the lightness selecting section 114, and the color difference selecting section 116 (Step S5). When the four types of single color inks of yellow (Y), magenta (M), cyan (C), and black (Bk) are accommodated in the ink-accommodating section of the ink-jet recording apparatus in the same manner as in the first embodiment described above, and the mixed ink (Y:M=5:5) is selected, then the yellow (Y) and the magenta (M) may be discharged respectively at a ratio of 5:5 to prepare the mixed ink (Y:M=5:5) on the forming portion of the boundary portion PC. In this embodiment, Condition (III) is selected in the additional condition selecting section 117, in accordance with the judging technique in which Condition (III) is utilized in a case that an ink having a color of the same type as that of the ink A or the ink B is included in the plurality of the inks C. As a result, the mixed ink (Y:M=5:5) is selected as the ink for forming the boundary portion PC.

Subsequently, the recording portion PA is formed by using the ink A based on the instruction from the recording portion PA forming section 102 (Step S6), and the recording portion PB is formed by using the ink B based on the instruction from the recording portion PB forming section 103 (Step S7).

Sixth Embodiment

Figure 6A:
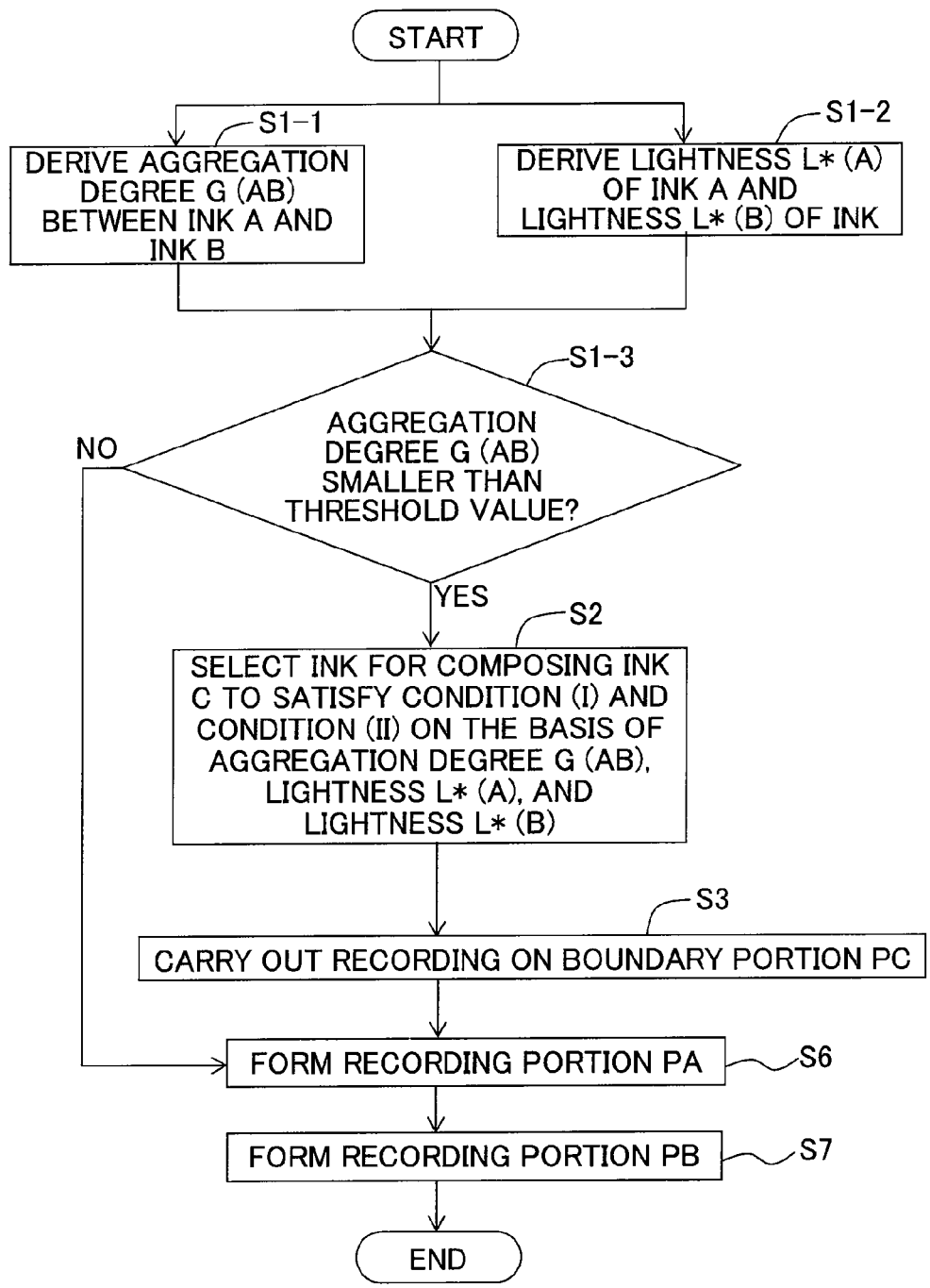
FIG. 6A shows a flow chart in relation to a sixth embodiment of the present invention.
Figure 6B:
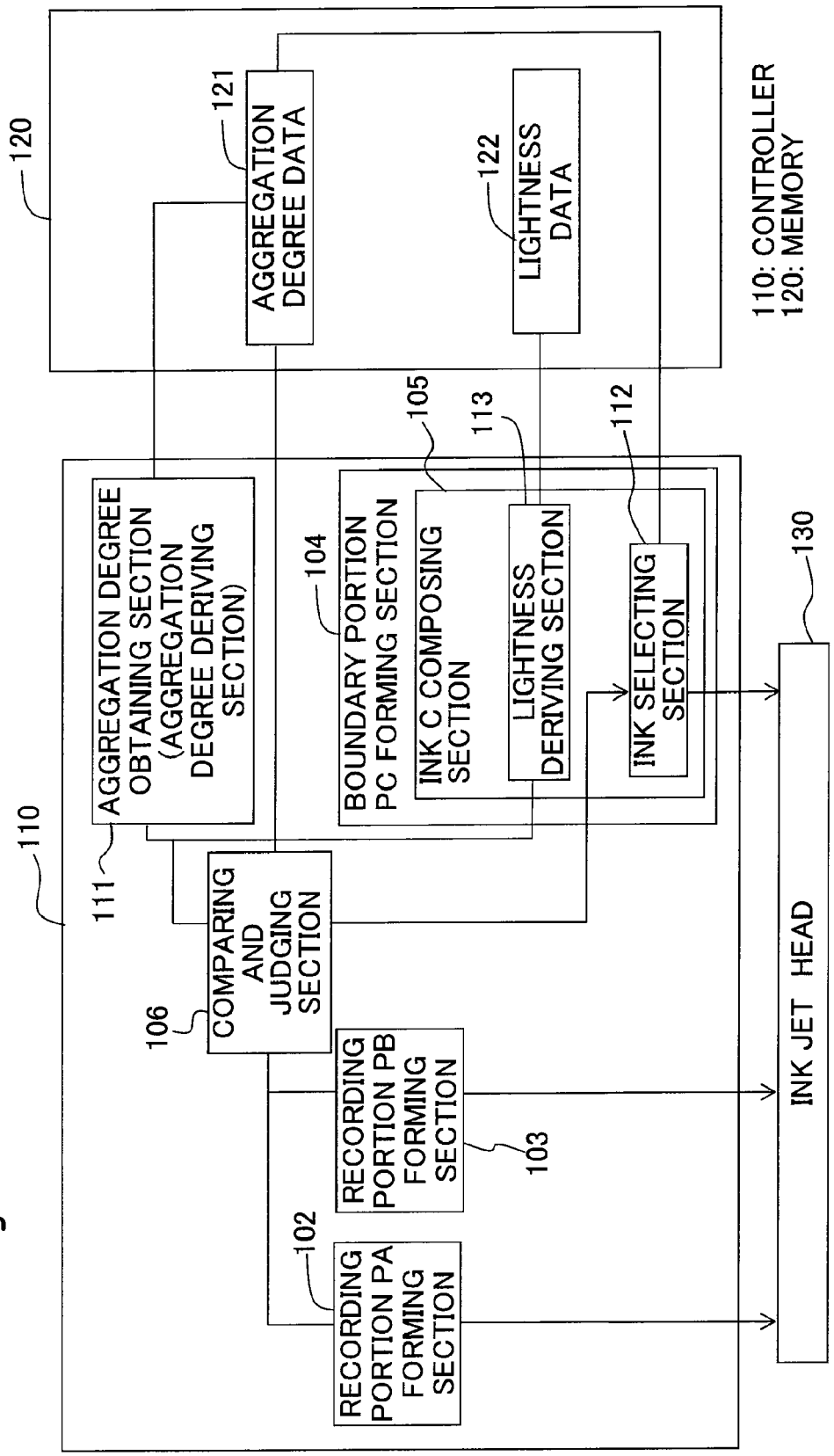
FIG. 6B shows a block diagram illustrating a relationship among a controller, a memory, and an ink jet head of an ink-jet recording apparatus in the sixth embodiment of the present invention.

The block diagram shown in FIG. 6B illustrates the relationship among the controller, the memory, and the ink jet head in an ink jet recording apparatus of this embodiment. As shown in FIG. 6B, the aggregation degree data 121 and the lightness data 122 are stored in the memory 120. The controller 110 includes the aggregation degree obtaining section (aggregation degree deriving section) 111, the comparing and judging section 106, the recording portion PA forming section 102, the recording portion PB forming section 103, and the boundary portion PC forming section 104. Further, the boundary portion PC forming section 104 includes the ink C composing section 105, and the ink C composing section 105 includes the lightness deriving section 113 and the ink selecting section 112. The aggregation degree deriving section 111 and the ink selecting section 112 are connected to the aggregation degree data 121. The lightness deriving section 113 is connected to the lightness data 122.

The ink-jet recording method of this embodiment is carried out, for example, as follows by using the aggregation degree data shown in Table 1 and the lightness data shown in Table 2.

At first, as shown in FIGS. 6A and 6B, the aggregation degree G (AB) between the ink A and the ink B is derived by the aggregation degree deriving section 111 (Step S1-1). For example, when the ink A is the black (Bk), and the ink B is the magenta (M), then the aggregation degree G (AB) is "8" in the same manner as in the first embodiment described above. Simultaneously with the derivation of the aggregation degree, as shown in FIGS. 6A and 6B, the lightness L* (A) of the ink A and the lightness L* (B) of the ink B are derived by the lightness deriving section 113 (Step S1-2). For example, when the ink A is the black (Bk), and the ink B is the magenta (M), then the lightness L* (A) is "10", and the lightness L* (B) is "52".

Subsequently, in the comparing and judging section 106, the aggregation degree G (AB) is compared with a predetermined value, i.e., threshold value 1 to judge whether the aggregation degree G (AB) is larger or smaller than the predetermined value, i.e., threshold value 1 (Step S1-3). If the aggregation degree G (AB) is smaller than the threshold value 1, the ink for composing the ink C is selected (Step S2). If the aggregation degree G (AB) is not less than the threshold value 1, then the ink C is not selected, and the recording portion PA and the recording portion PB are formed (Steps S6 and S7).

In this embodiment, the threshold value 1 is the maximum value capable of being provided for the aggregation degree G (AD) or the aggregation degree G (BD) in the same manner as in the first embodiment. In other words, when the ink A is the black (Bk), and the ink B is the magenta (M), then the threshold value 1 is "10". According to the aggregation degree data 121, the aggregation degree G (AB) is "8" which is smaller than "10". Therefore, the routine proceeds to the selection of the ink for composing the ink C (Step S2).

Subsequently, as shown in FIGS. 6A and 6B, the ink, which constitutes the ink C, is selected to satisfy Condition (I) and Condition (II) described above based on the derived aggregation degree G (AB), the derived lightness L* (A), and the derived lightness L* (B) by the ink selecting section 112 (Step S2). For example, when the ink A is the black (Bk), and the ink B is the magenta (M), then the lightness L* (A) is "10", and the lightness L* (B) is "52", which falls under the case of "lightness L* (A)<lightness L* (B)" of the expression (3) in accordance with Condition (II) described above. In this case, it is necessary that the expression (1) "aggregation degree G (AC)>aggregation degree G (AB)" should be satisfied. The aggregation degree G (AB) is "8" in this case. Therefore, the combinations of the inks, in which the aggregation degree exceeds "8", reside in "10" of the black (Bk) and the yellow (Y) and "9" of the black (Bk) and the mixed ink (Y:M=5:5), both of which satisfy the expression (1). Therefore, the yellow (Y) or the mixed ink (Y:M=5:5) can be selected as the ink C which satisfies Condition (I) and Condition (II) described above from the aggregation degree data 121. In this embodiment, the yellow (Y), which is the single color ink with the simple discharge mechanism, is selected as the ink C.

Subsequently, as shown in FIGS. 6A and 6B, the selected ink is discharged to carry out the recording of the boundary portion PC by the ink jet head 130 based on the instruction from the boundary portion PC forming section 104 including the ink selecting section 112 (Step S3).

Subsequently, the recording portion PA is formed by using the ink A based on the instruction from the recording portion PA forming section 102 (Step S6), and the recording portion PB is formed by using the ink B based on the instruction from the recording portion PB forming section 103 (Step S7).

If one ink satisfies Condition (I), it is unnecessary that the lightness should be derived and the ink to satisfy Condition (II) should be selected. However, if a plurality of inks, which satisfy Condition (I), exist, the ink, which satisfies both of Condition (I) and Condition (II) described above, can be selected in a short period of time by simultaneously carrying out the derivation of the aggregation degree and the derivation of the lightness as in this embodiment.

In this embodiment, Condition (III) described above is not used. However, the present invention is not limited thereto. Condition (III) may be used prior to the recording the boundary portion PC after selecting the ink for composing the ink C in the same manner as in the third embodiment.

Seventh Embodiment

This embodiment is an example in which the ink C is selected to form the boundary portion PC in the same manner as in the third embodiment described above by using Condition (X) described below. Condition (X) resides in such a condition that "8" is set as the threshold value 2 for the aggregation degree G (AB) in Condition (II'), and it is judged whether or not the extent of difference k=2 is appropriate, in accordance with the threshold value 2.

Condition (X):
(i) If lightness L* (A)≦lightness L* (B) is given, and aggregation degree G (AB)<8 is given, then aggregation degree G (AC)>aggregation degree G (AB)+2 is given.
(ii) If lightness L* (A)≦lightness L* (B) is given, and aggregation degree G (AB)≧8 is given, then aggregation degree G (AC)>aggregation degree G (AB) is given.
(iii) If lightness L* (A)>lightness L* (B) is given, and aggregation degree G (AB)<8 is given, then aggregation degree G (BC)>aggregation degree G (AB)+2 is given.
(iv) If lightness L* (A)>lightness L* (B) is given, and aggregation degree G (AB)≧8 is given, then aggregation degree G (BC)>aggregation degree G (AB) is given.

At first, as shown in FIGS. 3A and 3B, the aggregation degree G (AB)=8 is derived from the aggregation degree data shown in Table 1 in Step S1 described above.

Subsequently, in the comparing and judging section 106, the aggregation degree G (AB) is compared with a predetermined value, i.e., threshold value 1 to judge whether the aggregation degree G (AB) is larger or smaller than the predetermined value, i.e., threshold value 1 (Step S1-3). In this embodiment, the threshold value 1 is "10" in the same manner as in the first embodiment. According to the aggregation degree data 121, the aggregation degree G (AB) is "8" which is smaller than "10". Therefore, the routine proceeds to the selection of the ink for composing the ink C (Step S2).

Subsequently, as shown in FIGS. 3A and 3B, the two inks of the yellow (Y) (aggregation degree: 10) and the mixed ink (Y:M=5:5) (aggregation degree: 9) are selected in accordance with the aggregation degree data shown in Table 1 in Step S2 described above. As a result, it is judged in Step S3 described above that a plurality of inks C, which satisfy Condition (I) described above, exist (Yes), and the routine proceed to Step S3-1.

Subsequently, as shown in FIGS. 3A and 3B, the lightness L* (A)=10 and the lightness L* (B)=52 are derived from the hue data shown in Table 2 in Step S3-1 described above. Therefore, (ii) of Condition (X) described above is applied, and the condition is provided such that the aggregation degree should exceed 8 in relation to ink C.

Subsequently, as shown in FIGS. 3A and 3B, the two inks of the yellow (Y) and the mixed ink (Y:M=5:5) are selected as the inks for composing the ink C in which the aggregation degree exceeds 8, in Step S3-2 described above. As a result, it is judged in Step S4 described above that a plurality of inks C, which satisfy Condition (II) described above, exist (Yes), and the routine proceeds to Step S4-1.

Subsequently, as shown in FIGS. 3A and 3B, the color difference ΔE (AC) and the color difference ΔE (BC) are derived for the two inks respectively from the hue data shown in Table 2 in Step S4-1 described above. Subsequently, the mixed ink (Y:M=5:5) is selected as the ink C which satisfies Condition (III) described above in Step S4-2.

Subsequently, as shown in FIGS. 3A and 3B, the recording of the boundary portion PC is carried out with the mixed ink (Y:M=5:5) in Step S5 described above. After that, the recording portion PA is formed by using the ink A in Step S6, and the recording portion PB is formed by using the ink B in Step S7.

Eighth Embodiment

This embodiment is an example in which the ink C is selected to form the boundary portion PC in the same manner as in the seventh embodiment described above except that the black (Bk) is used as the ink A and the mixed ink (M:C=5:5) is used as the ink B.

At first, as shown in FIGS. 3A and 3B, the aggregation degree G (AB)=5 is derived from the aggregation degree data shown in Table 1 in Step S1 described above.

Subsequently, in the comparing and judging section 106, the aggregation degree G (AB) is compared with a predetermined value, i.e., threshold value 1 to judge whether the aggregation degree G (AB) is larger or smaller than the predetermined value, i.e., threshold value 1 (Step S1-3). In this embodiment, the threshold value 1 is "10" in the same manner as in the first embodiment. According to the aggregation degree data 121, the aggregation degree G (AB) is "5" which is smaller than "10". Therefore, the routine proceeds to the selection of the ink for composing the ink C (Step S2).

Subsequently, as shown in FIGS. 3A and 3B, the four inks of the yellow (Y) (aggregation degree: 10), the magenta (M) (aggregation degree: 8), the mixed ink (Y:M=5:5) (aggregation degree: 9), and the mixed ink (Y:M=5:5) (aggregation degree: 6) are selected from the aggregation degree data shown in Table 1 in Step S2 described above. As a result, it is judged in Step S4 described above that a plurality of inks C, which satisfy Condition (I) described above, exist (Yes), and the routine proceed to Step S3-1.

Subsequently, as shown in FIGS. 3A and 3B, the lightness L* (A)=10 and the lightness L* (B)=50 are derived from the hue data shown in Table 2 in Step S3-1 described above. Therefore, (i) of Condition (X) described above is applied, and the condition is provided such that the aggregation degree exceeds 7 in relation to the ink C.

Subsequently, as shown in FIGS. 3A and 3B, the three inks of the yellow (Y), the magenta (M), and the mixed ink (Y:M=5:5) are selected as the inks for composing the ink C in which the aggregation degree exceeds 7, in Step S3-2 described above. As a result, it is judged in Step S4 described above that a plurality of inks C, which satisfy Condition (II) described above, exist (Yes), and the routine proceeds to Step S4-1.

Subsequently, as shown in FIGS. 3A and 3B, the color difference ΔE (AC) and the color difference ΔE (BC) are derived for the three inks respectively from the hue data shown in Table 2 in Step S4-1 described above. Subsequently, the mixed ink (Y:M=5:5) is selected as the ink C which satisfies Condition (III) described above in Step S4-2.

Subsequently, as shown in FIGS. 3A and 3B, the recording of the boundary portion PC is carried out with the mixed ink (Y:M=5:5) in Step S5 described above. After that, the recording portion PA is formed by using the ink A in Step S6, and the recording portion PB is formed by using the ink B in Step S7.

Ninth Embodiment

This embodiment resides in such an example that the ink jet recording is carried out in accordance with FIG. 1B in the same manner as in the first embodiment except that the black (Bk) is used as the ink A and the yellow (Y) is used as the ink B.

At first, as shown in FIGS. 1A and 1B, the aggregation degree G (AB)=10 is derived from the aggregation degree data shown in Table 1 in Step 1.

Subsequently, in the comparing and judging section 106, the aggregation degree G (AB) is compared with a predetermined value, i.e., threshold value 1 to judge whether the aggregation degree G (AB) is larger or smaller than the predetermined value, i.e., threshold value 1 (Step S1-3). In this embodiment, the threshold value 1 is "10" in the same manner as in the first embodiment. According to the aggregation degree data 121, the aggregation degree G (AB) is "10" which is equal to "10" of the threshold value 1. Therefore, the ink is not selected, and the routine proceeds to Step S6. The recording portion PA is formed by using the ink A in Step S6, and then the recording portion PB is formed by using the ink B in Step S7. In this embodiment, it is judged that the bleeding hardly occurs between the recording portion PA and the recording portion PB and no improvement is required, because the aggregation degree G (AB) is not less than the predetermined value. The boundary portion PC is not formed.

In the first to ninth embodiments explained above, the aggregation degree data, the lightness data, and the hue data are used for the derivation of the aggregation degree G (AB), the derivation of the lightness, the derivation of the color difference, and the selection of the ink for composing the ink C. However, the present invention is not limited thereto. It is allowable that only one piece or two pieces of the data described above is/are used, and it is also allowable that all pieces of the data described above are not used, irrelevant to the presence or absence of the aggregation degree data, the lightness data, and the hue data. When the pieces of the data described above are not used, for example, the following procedure is assumed. That is, the aggregation degree, the lightness, and the color difference are evaluated and determined in situ (on-site), if necessary, and the required data is inputted into the controller in each occasion.

In the ink jet recording method and the ink jet recording apparatus of the first to ninth embodiments explained above, the ink for composing the ink C may be selected so that Condition (I), Condition (II), or Condition (III) is satisfied with reference to the recording-related information. The recording-related information includes, for example, the color (for example, white or colored (for example, blue, yellow, or green)) of the recording medium for forming the recording portion PA, the recording portion PB, and the boundary portion PC, the material (for example, regular paper or glossy paper) of the recording medium, and the type of the ink to be used for the recording (for example, pigment water base ink or dye water base ink). The color of the recording medium is not specifically limited. The color of the recording medium may be white or colored (for example, blue, green, or yellow). As for the white recording medium, for example, any recording medium, in which the L* value is not less than 90, may be adopted. In this case, a plurality of types of the aggregation degree data, the lightness data, and the hue data may be prepared beforehand for every different recording-related information, and the appropriate aggregation degree data, the appropriate lightness data, and the appropriate hue data may be selected and used in accordance with the recording-related information.

In the ink-jet recording apparatus of the first to ninth embodiments explained above, the comparing and judging section 106 is included in the controller 110 of the ink-jet recording apparatus. However, it is not necessarily indispensable that the ink-jet recording apparatus of the present invention includes the comparing and judging section 106. For example, it is allowable that a computer is connected to the ink-jet recording apparatus, and that the comparing and judging section 106 may be included in the computer connected to the ink-jet recording apparatus or in a printer driver installed in the computer. In such a case, the value of the aggregation degree G (AB) between the ink A and the ink B is forwarded or sent to the comparing and judging section 106 in the computer connected to the ink-jet recording apparatus; then in the comparing and judging section 106 in the computer, the aggregation degree G (AB) is compared with a predetermined value, i.e., threshold value 1 to judge whether the aggregation degree G (AB) is larger or smaller than the predetermined value, i.e., threshold value 1; and then the result of comparison and judgment is sent to the ink-jet recording apparatus from the computer connected thereto.

In the ink-jet recording method of the first to ninth embodiments explained above, the recording portion PA and the recording portion PB are formed after the formation of the boundary portion PC. However, it is not necessarily indispensable that the present invention is performed in this order as described above. It is allowable that the formations of the recording portion PA, the recording portion PB and the boundary portion PC are performed substantially at the same time. Alternatively, it is allowable that the order of formations of the recording portion PA, the recording portion PB and the boundary portion PC is appropriately changed as necessary.

EXAMPLES

Next, Examples of the present invention will be explained together with Comparative Examples. The present invention is neither limited nor restricted by Examples and Comparative Examples described below.

Preparation of Inks (1) Pigment Water Base Black Ink

Components except for "CAB-O-JET (trade name) 300", which were included in ink composition components (Table 3), were mixed uniformly or homogeneously to obtain an ink solvent. Subsequently, the ink solvent was added little by little to "CAB-O-JET (trade name) 300", followed by being mixed uniformly or homogeneously. After that, an obtained mixture was filtrated through a membrane filter (pore size 3.00 μm) of the cellulose acetate type produced by Toyo Roshi Kaisha, Ltd., and thus a pigment water base black ink for ink jet recording (Bk-1) was obtained.

(2) Dye Water Base Ink

Ink composition components (Table 3) were mixed uniformly or homogeneously. After that, obtained mixtures were filtrated through a membrane filter (pore size 0.20 μm) of the hydrophilic polytetrafluoroethylene (PTFE) type produced by Toyo Roshi Kaisha, Ltd. to thereby prepare dye water base yellow inks (Y-1 to Y-3), water base magenta inks (M-1, M-2), water base light magenta ink (LM-1), and water base cyan inks (C-1, C-2) for the ink-jet recording.

Evaluation Criterion of Aggregation Degree Evaluation

Figure 12A:
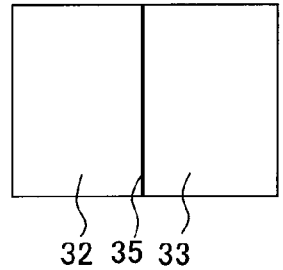
FIGS. 12A, 12B, and 12C illustrate the evaluation criteria for the aggregation degree evaluation in Examples of the present invention.

1: Any aggregation was not observed at the interface 35 between the both inks as shown in FIG. 12A.

Figure 12B:
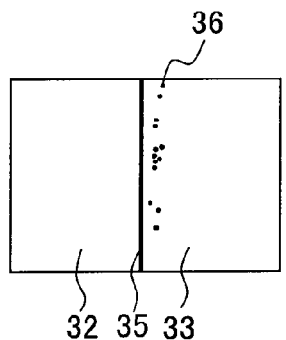

2: Small solid matters 36, which were brought about by the aggregation, were observed in the vicinity of the interface 35 between the both inks as shown in FIG. 12B.

Figure 12C:
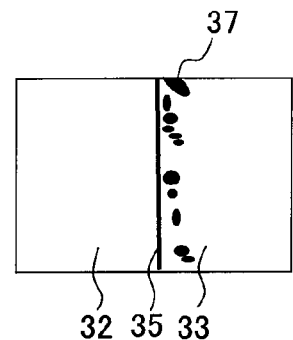

3: Large solid matters 37, which were brought about by the aggregation, were observed in the vicinity of the interface 35 between the both inks as shown in FIG. 12C.

Evaluation of Bleeding

Figure 11A:
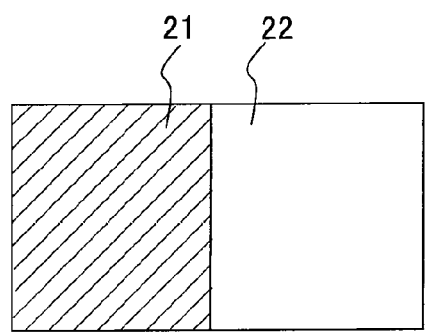
FIGS. 11A and 11B illustrate an evaluation method for evaluating the bleeding in Examples of the present invention.
Figure 11B:
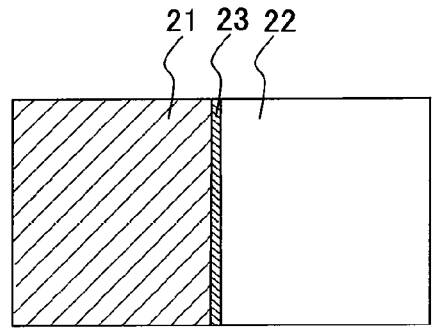

Two or three types of the inks except for Bk-1 and Bk-2, which were included in the water base inks shown in Table 3, where charged into ink cartridges respectively. Subsequently, the ink cartridges were installed to a digital multifunction machine DCP-330C carried with an ink jet printer produced by Brother Industries, Ltd. Subsequently, a bleeding evaluation sample 1 (FIG. 11A) was recorded on the regular paper ("Recycled Supreme" produced by XEROX) by using one or two types of the water base inks included in the two or three types of the water base inks except for Bk-1 and Bk-2 described above. Subsequently, a bleeding evaluation sample 2 (FIG. 11B) was recorded on the regular paper by using two or three types of the water base inks except for Bk-1 and Bk-2

TABLE 3

(unit: % by weight)

| | | Bk-1 | Y-1 | Y-2 | Y-3 | M-1 | M-2 | LM-1 | C-1 | C-2 |
|---|---|---|---|---|---|---|---|---|---|---|
| Coloring agent | CAB-O-JET (trade name) 300 (*1) | 25.0 (3.75) | — | — | — | — | — | — | — | — |
| | C.I. Direct Yellow 86 | — | 0.5 | 0.5 | 1.0 | — | — | — | — | — |
| | C.I. Direct Yellow 132 | — | 2.0 | 2.0 | 4.0 | — | — | — | — | — |
| | C.I. Acid Red 289 | — | — | — | — | 3.0 | — | 1.0 | — | — |
| | C.I. Direct Red 80 | — | — | — | — | — | 3.0 | — | — | — |
| | C.I. Direct Blue 199 | — | — | — | — | — | — | — | 4.0 | 4.0 |
| Glycerol | | 20.0 | 15.0 | 15.0 | 15.0 | 25.0 | 25.0 | 25.0 | 20.0 | 20.0 |
| Polyethylene glycol #200 | | — | 10.0 | 10.0 | 10.0 | — | — | — | — | — |
| Triethylene glycol-n-butyl ether | | 3.0 | 4.0 | 4.0 | 4.0 | 4.0 | 4.0 | 4.0 | 4.0 | 2.0 |
| SUNNOL (trade name) NL-1430 (*2) | | 0.2 (0.056) | 0.3 (0.084) | 0.3 (0.084) | 0.3 (0.084) | 0.2 (0.056) | 0.2 (0.056) | 0.2 (0.056) | 0.2 (0.056) | 0.2 (0.056) |
| Sodium chloride | | — | — | 1.0 | — | — | — | — | — | 1.0 |
| Water | | balance | balance | balance | balance | balance | balance | balance | balance | balance |

(*1): Self-dispersible black pigment (produced by Cabot Specialty Chemicals, pigment solid content: 15% by weight, parenthesized numerals indicate pigment solid content amounts).
(*2): Sodium polyoxyethylene alkyl (12, 13) ether sulfate (3E.O.), active ingredient amount: 28% by weight, produced by Lion Corporation (parenthesized numerals indicate active ingredient amounts).

Evaluation of Aggregation Degree

At first, as shown in FIG. 9A, each of an ink 32 and an ink 33 was dripped in an amount of 3 μL onto a clean slide glass 31 while being separated from each other by about 10 mm by using a dispenser Digifit AU-20 produced by SIBATA SCIENTIFIC TECHNOLOGY LTD. Subsequently, as shown in FIG. 9B, the dripped inks were covered with a cover glass 34, and thus the both inks were brought in contact with each other. An interface 35 between the both inks, which was provided on a prepared slide produced as described above, was observed at 20× magnification with an industrial microscope ECLIPSE LV100D produced by Nikon Corporation. The evaluation was made in accordance with the following evaluation criterion by using the indexes of the sizes of aggregated matters and the amounts of aggregated matters.

described above. In the bleeding evaluation sample 1, the recording was performed while bringing the recording portion PA (21) and the recording portion PB (22) in contact with each other. In the bleeding evaluation sample 2, the recording was performed while bringing the recording portion PA (21) and the boundary portion PC (23) in contact with each other and bringing the recording portion PB (22) and the boundary portion PC (23) in contact with each other. The bleeding between the recording portion PA and the recording portion PB was visually evaluated for the bleeding evaluation sample 1 and the bleeding evaluation sample 2, and the evaluation was made in accordance with the following evaluation criterion in relation to the degree or extent of the blurring at the boundary portion between the recording portion PA, the recording portion PB. Details of the bleeding evaluation sample 2 will be explained in Examples 1 to 6 and Comparative Examples 1 to 4 described below.

Evaluation Criterion of Bleeding Evaluation

G: The bleeding of the bleeding evaluation sample 2 was better than that of the bleeding evaluation sample 1.

NG: The bleeding of the bleeding evaluation sample 2 was inferior to that of the bleeding evaluation sample 1, or the bleeding was equivalent between the both samples.

Example 1

Example 1 was carried out as follows in accordance with the first embodiment. Bk-1 was used as the ink A, and C-1 was used as the ink B. At first, as shown in FIGS. 1A and 1B, the aggregation degree G (AB) between the ink A and the ink B was obtained by the aggregation degree obtaining section 111 based on the aggregation degree evaluation described above (Step S1). The aggregation degree G (AB) was "1".

Subsequently, the aggregation degree G (AB) was compared with the predetermined value, i.e., threshold value 1 by the comparing and judging section 106 to judge whether the aggregation degree G (AB) was larger or smaller than the predetermined value, i.e., threshold value 1 (Step S1-3). In Example 1, the threshold value 1 was "3". The aggregation degree G (AB) was "1" which was smaller than "3" of the threshold value 1. Therefore, the process proceeds to the selection of the ink for composing the ink C (Step S2).

Subsequently, the ink for composing the ink C was selected to satisfy Condition (I) based on the aggregation degree G (AB) by the ink selecting section 112 included in the boundary portion PC forming section 104 (Step S2). Y-1 was used as the ink C to evaluate the aggregation degree. As a result, the aggregation degree G (AC)=2 was given, which satisfied Condition (I).

Subsequently, the selected ink, i.e., Y-1 was discharged to carry out the recording of the boundary portion PC by the ink jet head 130 based on the instruction from the boundary portion PC forming section 104 including the ink selecting section 112 (Step S3).

Subsequently, the recording portion PA was formed by using the ink A (Bk-1) based on the instruction from the recording portion PA forming section 102 (Step S6), and the recording portion PB was formed by using the ink B (C-1) based on the instruction from the recording portion PB forming section 103 (Step S7).

Example 2

Example 2 was carried out as follows in accordance with the first embodiment in the same manner as Example 1 by using Bk-1 as the ink A and using (Y-1:C-1=5:5) as the ink B. At first, as shown in FIGS. 1A and 1B, the aggregation degree G (AB) between the ink A and the ink B was obtained by the aggregation degree obtaining section 111 based on the aggregation degree evaluation described above (Step S1). The aggregation degree G (AB) was "2".

Subsequently, the aggregation degree G (AB) was compared with the predetermined value, i.e., threshold value 1 by the comparing and judging section 106 to judge whether the aggregation degree G (AB) was larger or smaller than the predetermined value, i.e., threshold value 1 (Step S1-3). The aggregation degree G (AB) was "2" which was smaller than "3" of the threshold value 1. Therefore, the process proceeds to the selection of the ink for composing the ink C (Step S2).

Subsequently, the ink for composing the ink C was selected to satisfy Condition (I) based on the aggregation degree G (AB) by the ink selecting section 112 included in the boundary portion PC forming section 104 (Step S2). Y-2 was used as the ink C to evaluate the aggregation degree. As a result, the aggregation degree G (AC)=3 was given, which satisfied Condition (I).

Subsequently, the selected ink C, i.e., (Y-2) was discharged to carry out the recording of the boundary portion PC by the ink jet head 130 (Step S3). Subsequently, the recording portion PA was formed by using the ink A (Bk-1) based on the instruction from the recording portion PA forming section 102 (Step S6), and the recording portion PB was formed by using the ink B (Y-1:C-1=5:5) based on the instruction from the recording portion PB forming section 103 (Step S7).

Example 3

Example 3 was carried out as follows in accordance with the first embodiment in the same manner as Example 1 by using Bk-1 as the ink A and using Y-1 as the ink B. At first, as shown in FIGS. 1A and 1B, the aggregation degree G (AB) between the ink A and the ink B was obtained by the aggregation degree obtaining section 111 based on the aggregation degree evaluation described above (Step S1). The aggregation degree G (AB) was "2".

Subsequently, the aggregation degree G (AB) was compared with the predetermined value, i.e., threshold value 1 by the comparing and judging section 106 to judge whether the aggregation degree G (AB) was larger or smaller than the predetermined value, i.e., threshold value 1 (Step S1-3). The aggregation degree G (AB) was "2" which was smaller than "3" of the threshold value 1. Therefore, the process proceeds to the selection of the ink for composing the ink C (Step S2).

Subsequently, the ink for composing the ink C was selected to satisfy Condition (I) based on the aggregation degree G (AB) by the ink selecting section 112 included in the boundary portion PC forming section 104 (Step S2). Y-3 was used as the ink C to evaluate the aggregation degree. As a result, the aggregation degree G (AC)=3 was given, which satisfied Condition (I).

Subsequently, as shown in FIGS. 1A and 1B, the selected ink C, i.e., (Y-3) was discharged to carry out the recording of the boundary portion PC by the ink jet head 130 (Step S3). Subsequently, the recording portion PA was formed by using the ink A (Bk-1) based on the instruction from the recording portion PA forming section 102 (Step S6), and the recording portion PB was formed by using the ink B (Y-1) based on the instruction from the recording portion PB forming section 103 (Step S7).

Example 4

Example 4 was carried out as follows in accordance with the first embodiment in the same manner as Example 1 by using Bk-1 as the ink A and using M-1 as the ink B. At first, as shown in FIGS. 1A and 1B, the aggregation degree G (AB) between the ink A and the ink B was obtained by the aggregation degree obtaining section 111 based on the aggregation degree evaluation described above (Step S1). The aggregation degree G (AB) was "1".

Subsequently, the aggregation degree G (AB) was compared with the predetermined value, i.e., threshold value 1 by the comparing and judging section 106 to judge whether the aggregation degree G (AB) was larger or smaller than the predetermined value, i.e., threshold value 1 (Step S1-3). The aggregation degree G (AB) was "1" which was smaller than "3" of the threshold value 1. Therefore, the process proceeds to the selection of the ink for composing the ink C (Step S2).

Subsequently, the ink for composing the ink C was selected to satisfy Condition (I) based on the aggregation degree G (AB) by the ink selecting section 112 included in the boundary portion PC forming section 104 (Step S2). Y-3 was used as the ink C to evaluate the aggregation degree. As a result, the aggregation degree G (AC)=3 was given, which satisfied Condition (I).

Subsequently, the selected ink C, i.e., (Y-3) was discharged to carry out the recording of the boundary portion PC by the ink jet head 130 (Step S3). Subsequently, the recording portion PA was formed by using the ink A (Bk-1) based on the instruction from the recording portion PA forming section 102 (Step S6), and the recording portion PB was formed by using the ink B (M-1) based on the instruction from the recording portion PB forming section 103 (Step S7).

Example 5

Example 5 was carried out as follows in accordance with the first embodiment in the same manner as Example 1 by using Bk-1 as the ink A and using (Y-1:M-1=5:5) as the ink B. At first, as shown in FIGS. 1A and 1B, the aggregation degree G (AB) between the ink A and the ink B was obtained by the aggregation degree obtaining section 111 based on the aggregation degree evaluation described above (Step S1). The aggregation degree G (AB) was "2".

Subsequently, the aggregation degree G (AB) was compared with the predetermined value, i.e., threshold value 1 by the comparing and judging section 106 to judge whether the aggregation degree G (AB) was larger or smaller than the predetermined value, i.e., threshold value 1 (Step S1-3). The aggregation degree G (AB) was "2" which was smaller than "3" of the threshold value 1. Therefore, the process proceeds to the selection of the ink for composing the ink C (Step S2).

Subsequently, the ink for composing the ink C was selected to satisfy Condition (I) based on the aggregation degree G (AB) by the ink selecting section 112 included in the boundary portion PC forming section 104 (Step S2). LM-1 was used as the ink C to evaluate the aggregation degree. As a result, the aggregation degree G (AC)=3 was given, which satisfied Condition (I).

Subsequently, the selected ink C, i.e., (LM-1) was discharged to carry out the recording of the boundary portion PC by the ink jet head 130 (Step S3). Subsequently, the recording portion PA was formed by using the ink A (Bk-1) based on the instruction from the recording portion PA forming section 102 (Step S6), and the recording portion PB was formed by using the ink B (Y-1:M-1=5:5) based on the instruction from the recording portion PB forming section 103 (Step S7).

Example 6

Example 6 was carried out as follows in accordance with the first embodiment in the same manner as Example 1 by using Bk-1 as the ink A and using M-1 as the ink B. At first, as shown in FIGS. 1A and 1B, the aggregation degree G (AB) between the ink A and the ink B was obtained by the aggregation degree obtaining section 111 based on the aggregation degree evaluation described above (Step S1). The aggregation degree G (AB) was "1".

Subsequently, the aggregation degree G (AB) was compared with the predetermined value. i.e., threshold value 1 by the comparing and judging section 106 to judge whether the aggregation degree G (AB) was larger or smaller than the predetermined value, i.e., threshold value 1 (Step S1-3). The aggregation degree G (AB) was "1" which was smaller than "3" of the threshold value 1. Therefore, the process proceeds to the selection of the ink for composing the ink C (Step S2).

Subsequently, the ink for composing the ink C was selected to satisfy Condition (I) based on the aggregation degree G (AB) by the ink selecting section 112 included in the boundary portion PC forming section 104 (Step S2). (Y-2:M-1=5:5) was used as the ink C to evaluate the aggregation degree. As a result, the aggregation degree G (AC)=3 was given, which satisfied Condition (I).

Subsequently, the selected ink C, i.e., (Y-2:M-1=5:5) was discharged to carry out the recording of the boundary portion PC by the ink jet head 130 (Step S3). Subsequently, the recording portion PA was formed by using the ink A (Bk-1) based on the instruction from the recording portion PA forming section 102 (Step S6), and the recording portion PB was formed by using the ink B (M-1) based on the instruction from the recording portion PB forming section 103 (Step S7).

Comparative Example 1

The recording portion PA, the recording portion PB, and the boundary portion PC were formed by using Bk-1 as the ink A, using Y-1 as the ink B, and using C-1 as the ink C. The aggregation degree was evaluated as described above. As a result, the aggregation degree G (AB)=2 and the aggregation degree G (AC)=1 were given, which did not satisfy Condition (I).

Comparative Example 2

The recording portion PA, the recording portion PB, and the boundary portion PC were formed by using Bk-1 as the ink A, using (Y-1:C-1=5:5) as the ink B, and using Y-1 as the ink C. The aggregation degree was evaluated as described above. As a result, the aggregation degree G (AB)=2 and the aggregation degree G (AC)=2 were given, which did not satisfy Condition (I).

Comparative Example 3

The recording portion PA, the recording portion PB, and the boundary portion PC were formed by using Bk-1 as the ink A, using M-2 as the ink B, and using C-1 as the ink C. The aggregation degree was evaluated as described above. As a result, the aggregation degree G (AB)=2 and the aggregation degree G (AC)=1 were given, which did not satisfy Condition (I).

Comparative Example 4

The recording portion PA, the recording portion PB, and the boundary portion PC were formed by using Bk-1 as the ink A, using C-2 as the ink B, and using C-1 as the ink C. The aggregation degree was evaluated as described above. As a result, the aggregation degree G (AB)=3 and the aggregation degree G (AC)=1 were given, which did not satisfy Condition (I).

The bleeding evaluation samples 1, which corresponded to the bleeding evaluation samples 2 prepared in Examples 1 to 6 and Comparative Examples 1 to 4 respectively, were prepared to evaluate the bleeding in accordance with the evaluation method and the evaluation criterion as described above. The types, the aggregation degrees, and the bleeding evaluation results of the inks used in Examples and Comparative Examples are shown in Table 4.

TABLE 4

| | Recording portion (ink) | | | Aggregation degree | | | Bleeding |
| | Recording portion A (ink A) | Recording portion B (ink B) | Boundary portion C (ink C) | AB | AC | BC | evaluation |
|---|---|---|---|---|---|---|---|
| Example 1 | Bk-1 | C-1 | Y-1 | 1 | 2 | 1 | G |
| Example 2 | Bk-1 | Y-1:C-1 = 5:5 | Y-2 | 2 | 3 | 1 | G |
| Example 3 | Bk-1 | Y-1 | Y-3 | 2 | 3 | 1 | G |
| Example 4 | Bk-1 | M-1 | Y-3 | 1 | 3 | 1 | G |
| Example 5 | Bk-1 | Y-1:M-1 = 5:5 | LM-1 | 2 | 3 | 1 | G |
| Example 6 | Bk-1 | M-1 | Y-2:M-1 = 5:5 | 1 | 3 | 1 | G |
| Comp. Ex. 1 | Bk-1 | Y-1 | C-1 | 2 | 1 | 1 | NG |
| Comp. Ex. 2 | Bk-1 | Y-1:C-1 = 5:5 | Y-1 | 2 | 2 | 1 | NG |
| Comp. Ex. 3 | Bk-1 | M-2 | C-1 | 2 | 1 | 1 | NG |
| Comp. Ex. 4 | Bk-1 | C-2 | C-1 | 3 | 1 | 1 | NG |

As shown in Table 4, the bleeding evaluation result was excellent in Examples 1 to 6 which satisfied Condition (I) described above. On the other hand, the bleeding evaluation result was inferior in Comparative Examples 1 to 4 which did not satisfy Condition (I) described above. In Comparative Example 4, the permeability of C-1 as the ink C was higher than the permeability of C-2 as the ink B, but any improvement in the bleeding was not observed.

What is claimed is:

1. An ink-jet recording method comprising:
determining an aggregation degree G (AB) brought about when the ink A and the ink B are brought in contact with each other, the inks A and B being different in color and composition from each other, each of which is composed by at least one ink selected from an ink set including at least two kinds of inks, which are subjected to recording on a medium while being brought in contact with each other, at least one of the ink A and the ink B containing a pigment;
judging, based on the aggregation degree G (AB), whether or not a boundary portion PC is to be formed at a boundary between a recording portion PA of the ink A and a recording portion PB of the ink B by using an ink C which is composed by at least one ink selected from the ink set and which has a different composition from those of the ink A and the ink B;
forming the recording portion PA with the ink A;
forming the recording portion PB with the ink B; and
forming the boundary portion PC with the ink C if it is judged that the boundary portion PC is to be formed.

2. The ink-jet recording method according to claim 1, wherein the judging is made that the boundary portion PC is to be formed if the aggregation degree G (AB) is lower than a predetermined value; and
the forming of the boundary portion PC includes composing the ink C by selecting at least one ink from the ink set so that the following condition (I) is satisfied:
Condition (I): at least one of the following expression (1) and the following expression (2) is satisfied:

$$G(AC) > G(AB) \qquad (1)$$

$$G(BC) > G(AB) \qquad (2)$$

G (AC): aggregation degree provided when the ink A and the ink C are brought in contact with each other;
G (BC): aggregation degree provided when the ink B and the ink C are brought in contact with each other;
G (AB): aggregation degree provided when the ink A and the ink B are brought in contact with each other.

3. The ink jet recording method according to claim 2, wherein the determining of the aggregation degree G (AB) includes deriving the aggregation degree G (AB) from aggregation degree data obtained when the inks included in the ink set are brought in contact with each other; and
the composing of the ink C includes selecting the ink for composing the ink C to satisfy the condition (I), from the aggregation degree data based on the derived G (AB).

4. The ink jet recording method according to claim 3, wherein in the composing of the ink C, at least one ink is selected from the ink set to compose the ink C so as to further satisfy the following condition (II) in addition to the condition (I):
Condition (II): if the following expression (3) is satisfied, the expression (1) is satisfied, or if the following expression (4) is satisfied, the expression (2) is satisfied:

$$L^*(A) < L^*(B) \qquad (3)$$

$$L^*(A) > L^*(B) \qquad (4)$$

L* (A): lightness L* of the ink A;
L* (B): lightness L* of the ink B.

5. The ink-jet recording method according to claim 4, wherein the composing of the ink C includes:
deriving the lightnesses of L* (A) and L* (B) from lightness data of each of the inks of the ink set; and
selecting the ink composing the ink C to satisfy the condition (II) from the aggregation degree data based on the derived G (AB), the derived L* (A), and the derived L* (B).

6. The ink-jet recording method according to claim 2, wherein in the composing of the ink C, at least one ink is selected from the ink set to compose the ink C so as to further satisfy the following condition (II) in addition to the condition (I):
Condition (II): if the following expression (3) is satisfied, the expression (1) is satisfied, or if the following expression (4) is satisfied, the expression (2) is satisfied:

$$L^*(A) < L^*(B) \qquad (3)$$

$$L^*(A) > L^*(B) \qquad (4)$$

L* (A): lightness L* of the ink A;
L* (B): lightness L* of the ink B.

7. The ink jet recording method according to claim 6, wherein the composing of the ink C further includes:
deriving the lightnesses of L* (A) and L* (B) from lightness data of each of the inks of the ink set; and selecting the ink composing the ink C to satisfy the condition (II) based on the derived L* (A) and the derived L* (B).

8. The ink-jet recording method according to claim 2, wherein if a plurality of inks which satisfy the condition (I) exist as a plurality of inks C in the composing of the ink C, one ink C among the inks C to further satisfy the following condition (III):

Condition (III): at least one color difference ΔE of color difference ΔE (AC) between the ink A and the ink C and color difference ΔE (BC) between the ink B and the ink C is smallest.

9. The ink-jet recording method according to claim 8, wherein the composing of the ink C further includes:

deriving the color difference ΔE (AC) and the color difference ΔE (BC) from hue data of the respective inks of the ink set; and selecting the ink C to satisfy the condition (III) from the plurality of inks C based on the derived color difference ΔE (AC) and the derived color difference ΔE (BC).

10. The ink-jet recording method according to claim 1, wherein at least one ink of the ink A and the ink B includes a water base black ink containing a black pigment.

11. An ink-jet recording apparatus comprising:

an ink accommodating section which accommodates at least two kinds of inks as an ink set;

an ink jet head which performs recording by using at least one ink selected from the ink set; and a controller which controls the ink jet head, wherein the controller includes: an aggregation degree obtaining section which obtains an aggregation degree G (AB) brought about when the ink A and the ink B are brought in contact with each other, the inks A and B being different in color and composition from each other, each of which is composed by at least one ink selected from the ink set, which are subjected to the recording on a medium while being brought in contact with each other, at least one of the ink A and the ink B containing a pigment;

a recording portion PA forming section which forms the recording portion PA with the ink A;

a recording portion PB forming section which forms the recording portion PB with the ink B; and a boundary portion PC forming section which forms a boundary portion PC at a boundary between the recording portion PA and the recording portion PB with an ink C which is composed by at least one ink selected from the ink set and which has a composition different from those of the ink A and the ink B.

12. The ink-jet recording apparatus according to claim 11, wherein the controller has a comparing and judging section which judges, based on the aggregation degree G (AB), whether or not the boundary portion PC is to be formed with the ink C.

13. The ink-jet recording apparatus according to claim 12, wherein the comparing and judging section judges that the boundary portion PC is to be formed if the aggregation degree G (AB) is lower than a predetermined value; and the boundary portion PC forming section includes an ink C composing section which composes the ink C by selecting at least one ink from the ink set so that the following condition (I) is satisfied:

Condition (I): at least one of the following expression (1) and the following expression (2) is satisfied:

$$G(AC) > G(AB) \tag{1}$$

$$G(BC) > G(AB) \tag{2}$$

G (AC): aggregation degree provided when the ink A and the ink C are brought in contact with each other;

G (BC): aggregation degree provided when the ink B and the ink C are brought in contact with each other;

G (AB): aggregation degree provided when the ink A and the ink B are brought in contact with each other.

14. The ink-jet recording apparatus according to claim 13, further comprising a memory, wherein the memory stores aggregation degree data obtained when the inks included in the ink set are brought in contact with each other;

the aggregation degree obtaining section has a aggregation degree deriving section which derives the aggregation degree G (AB) from the aggregation degree data; and the ink C composing section includes an ink selecting section which selects the ink composing the ink C to satisfy the condition (I), from the aggregation degree data based on the derived G (AB).

15. The ink jet recording apparatus according to claim 14, wherein the ink C composing section composes the ink C by selecting at least one ink from the ink set to further satisfy the following condition (II) in addition to the condition (I):

Condition (II): if the following expression (3) is satisfied, the expression (1) is satisfied, or if the following expression (4) is satisfied, the expression (2) is satisfied:

$$L^*(A) < L^*(B) \tag{3}$$

$$L^*(A) > L^*(B) \tag{4}$$

L* (A): lightness L* of the ink A;
L* (B): lightness L* of the ink B.

16. The ink jet recording apparatus according to claim 15, wherein the memory further stores lightness data of each of the inks of the ink set; and the ink C composing section further includes: a lightness deriving section which derives the lightnesses of L* (A) and L* (B) from the lightness data; and a lightness selecting section which selects the ink composing the ink C to satisfy the condition (II), from the aggregation degree data based on the derived G (AB), the derived L* (A), and the derived L* (B).

17. The ink-jet recording apparatus according to claim 13, wherein the ink C composing section composes the ink C by selecting at least one ink from the ink set to further satisfy the following condition (II) in addition to the condition (I):

Condition (II): if the following expression (3) is satisfied, the expression (1) is satisfied, or if the following expression (4) is satisfied, the expression (2) is satisfied:

$$L^*(A) < L^*(B) \tag{3}$$

$$L^*(A) > L^*(B) \tag{4}$$

L* (A): lightness L* of the ink A;
L* (B): lightness L* of the ink B.

18. The ink jet recording apparatus according to claim 17, further comprising a memory, wherein the memory stores lightness data of each of the inks of the ink set; and the ink C composing section includes a lightness deriving section which derives the lightnesses of L* (A) and L* (B) from the lightness data; and a lightness selecting section which selects the ink composing the ink C to satisfy the condition (II), based on the derived L* (A) and the derived L* (B).

19. The ink-jet recording apparatus according to claim 13, wherein if a plurality of inks which satisfy the condition (I)

exists as a plurality of inks C, the ink C composing section selects one ink C among the inks C to further satisfy the following condition (III):

Condition (III): at least one color difference ΔE of color difference ΔE (AC) between the ink A and the ink C and color difference ΔE (BC) between the ink B and the ink C is smallest.

20. The ink jet recording apparatus according to claim 19, wherein the memory further stores hue data of each of the inks of the ink set; and the ink C composing section further includes: a color difference deriving section which derives the color difference ΔE (AC) and the color difference ΔE (BC) from the hue data; and a color difference selecting section which selects the one ink C, among the plurality of inks C, to satisfy the condition (III), based on the derived color difference ΔE (AC) and the derived color difference ΔE (BC).

* * * * *